US012795072B2

(12) United States Patent
Chen et al.

(10) Patent No.: US 12,795,072 B2
(45) **Date of Patent: *Nov. 10, 2026**

(54) MOTION VECTOR PREDICTION FOR VIDEO CODING

(71) Applicant: HUAWEI TECHNOLOGIES CO., LTD., Shenzhen (CN)

(72) Inventors: Huanbang Chen, Shenzhen (CN); Haitao Yang, Shenzhen (CN); Jianle Chen, San Diego, CA (US); Weiwei Xu, Hangzhou (CN); Ting Fu, Shenzhen (CN); Jiali Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/885,854

(22) Filed: Sep. 16, 2024

(65) Prior Publication Data

US 2025/0024018 A1 Jan. 16, 2025

Related U.S. Application Data

(63) Continuation of application No. 17/139,837, filed on Dec. 31, 2020, now Pat. No. 12,113,959, which is a (Continued)

(51) Int. Cl.

*H04N 19/105* (2014.01)
*H04N 19/119* (2014.01)

(Continued)

(52) U.S. Cl.

CPC ......... *H04N 19/105* (2014.11); *H04N 19/119* (2014.11); *H04N 19/132* (2014.11);

(Continued)

(58) Field of Classification Search

CPC ............... H04N 19/105; H04N 19/119; H04N 19/132; H04N 19/159; H04N 19/176;

(Continued)

(56) References Cited

U.S. PATENT DOCUMENTS 9,756,337 B2 * 9/2017 Li ........................ H04N 19/124
10,397,603 B1 * 8/2019 Li ........................ H04N 19/105

(Continued)

FOREIGN PATENT DOCUMENTS

CA 3081335 A1 5/2019
CN 102595116 A 7/2012

(Continued)

OTHER PUBLICATIONS

Extended European Search Report dated Mar. 24, 2021, issued in EP Application No. 19831026.0, 8 pages.

(Continued)

*Primary Examiner* — Richard A Hansell, Jr.

(57) ABSTRACT

Technologies for inter prediction for a block in a video are provided. In one example, a method includes: when a size of a current block satisfies a preset condition, parsing a bitstream to obtain a syntax element, where the syntax element includes at least an index of optimal candidate motion information of the current block; determining, based on the syntax element, to construct a first list or a second list for the current block, where the first list is a block-based candidate motion information list, and the second list is a subblock-based candidate motion information list; determining optimal motion information from the first list or the second list based on the index; and predicting the current block based on the optimal motion information. In this method, the block-based candidate motion information list and the sub-block-based candidate motion information list are distin- (Continued)

guished from each other. This effectively reduces transmission costs of the optimal candidate motion information.

17 Claims, 15 Drawing Sheets

Related U.S. Application Data continuation of application No. PCT/CN2019/094429, filed on Jul. 2, 2019.

(60) Provisional application No. 62/699,750, filed on Jul. 18, 2018, provisional application No. 62/694,451, filed on Jul. 6, 2018, provisional application No. 62/693,444, filed on Jul. 2, 2018.

(51) Int. Cl.
*H04N 19/132* (2014.01)
*H04N 19/159* (2014.01)
*H04N 19/176* (2014.01)
*H04N 19/70* (2014.01)

(52) U.S. Cl.
CPC ......... *H04N 19/159* (2014.11); *H04N 19/176* (2014.11); *H04N 19/70* (2014.11)

(58) Field of Classification Search
CPC ...... H04N 19/70; H04N 19/53; H04N 19/593; H04N 19/513; H04N 19/96; H04N 19/52; H04N 19/157
See application file for complete search history.

(56) References Cited

U.S. PATENT DOCUMENTS

| | | | | |
|---|---|---|---|---|
| 10,582,210 | B2 * | 3/2020 | Huang | H04N 19/70 |
| 11,463,687 | B2 | 10/2022 | Zhang et al. | |
| 11,539,958 | B2 * | 12/2022 | Jang | H04N 19/176 |
| 2010/0135391 | A1 * | 6/2010 | Tian | H04N 19/103 375/E7.243 |
| 2014/0192884 | A1 * | 7/2014 | Laroche | H04N 19/147 375/240.16 |
| 2015/0085929 | A1 | 3/2015 | Chen et al. | |
| 2016/0219278 | A1 * | 7/2016 | Chen | H04N 19/52 |
| 2016/0366435 | A1 * | 12/2016 | Chien | H04N 19/51 |
| 2017/0054996 | A1 * | 2/2017 | Xu | H04N 19/593 |
| 2017/0289566 | A1 * | 10/2017 | He | H04N 19/147 |
| 2017/0332099 | A1 * | 11/2017 | Lee | H04N 19/51 |
| 2018/0070100 | A1 * | 3/2018 | Chen | H04N 19/597 |
| 2018/0084260 | A1 * | 3/2018 | Chien | H04N 19/52 |
| 2018/0352247 | A1 * | 12/2018 | Park | H04N 19/513 |
| 2019/0149838 | A1 * | 5/2019 | Zhang | H04N 19/176 375/240.16 |
| 2019/0387247 | A1 * | 12/2019 | Huang | H04N 19/107 |
| 2020/0221122 | A1 * | 7/2020 | Ye | H04N 19/577 |
| 2020/0288168 | A1 * | 9/2020 | Zhang | H04N 19/139 |
| 2021/0006788 | A1 * | 1/2021 | Zhang | H04N 19/139 |
| 2021/0168355 | A1 | 6/2021 | Chen | |
| 2021/0185338 | A1 * | 6/2021 | Xiu | H04N 19/51 |
| 2021/0266589 | A1 * | 8/2021 | Chen | H04N 19/55 |
| 2021/0321089 | A1 * | 10/2021 | Lin | H04N 19/105 |

FOREIGN PATENT DOCUMENTS

| | | | | |
|---|---|---|---|---|
| CN | 103716631 A | 4/2014 | | |
| CN | 104601988 A | 5/2015 | | |
| CN | 106789217 A | 5/2017 | | |
| CN | 107211156 A | 9/2017 | | |
| CN | 107613305 A | 1/2018 | | |
| CN | 108141588 A | 6/2018 | | |
| CN | 112866720 A | 5/2021 | | |
| JP | 2017518689 A | 7/2017 | | |
| JP | 2018506908 A | 3/2018 | | |
| KR | 20180018535 A | 2/2018 | | |
| WO | 2016201094 A1 | 12/2016 | | |
| WO | WO-2017052081 A1 | * | 3/2017 | H04N 19/577 |
| WO | 2018097115 A1 | 5/2018 | | |
| WO | 2020056172 A1 | 3/2020 | | |
| WO | 2020244660 A1 | 12/2020 | | |

OTHER PUBLICATIONS

Office Action issued in CN202011633846.0 dated Sep. 18, 2021, 12 pages.
Notice of Allowance issued in CN202011633846.0, dated Nov. 25, 2021, 4 pages.
Jianle Chen, et.al., Algorithm Description of Joint Exploration Test Model 7 (JEM 7), Joint Video Exploration Team (JVET) of ITU-T SG 16 WP 3 and ISO/IEC JTC 1/SC 29/WG 11 7th Meeting: Torino, IT, Jul. 13-21, 2017, [JVET-G1001-v1], Aug. 19, 2017, 49 pages.
Office Action issued in JP2021-500072, dated Jun. 6, 2022 with English translation, 14 pages.
Notice of Allowance issued in KR10-2021-7001462, dated Aug. 4, 2023, 3 pages.

* cited by examiner

| | Descriptor |
|---|---|
| if ( CuPredMode[x0][y0] == MODE_IBC ) { | |
| if( MaxNumMergeCand > 1 ) | |
| **merge_idx**[x0][y0] | ae(v) |
| } else { | |
| if( sps_mmvd_enabled_flag \|\| cbWidth * cbHeight != 32 ) | |
| **regular_merge_flag**[x0][y0] | ae(v) |
| if ( regular_merge_flag[x0][y0] == 1 ){ | |
| if( MaxNumMergeCand > 1 ) | |
| **merge_idx**[x0][y0] | ae(v) |
| } else { | |
| if( sps_mmvd_enabled_flag && cbWidth * cbHeight != 32 ) | |
| **mmvd_merge_flag**[x0][y0] | ae(v) |
| if( mmvd_merge_flag[x0][y0] == 1 ) { | |
| if( MaxNumMergeCand > 1 ) | |
| **mmvd_cand_flag**[x0][y0] | ae(v) |
| **mmvd_distance_idx**[x0][y0] | ae(v) |
| **mmvd_direction_idx**[x0][y0] | ae(v) |
| } else { | |
| if( MaxNumSubblockMergeCand > 0 && cbWidth >= 8 && cbHeight >= 8 ) | |
| **merge_subblock_flag**[x0][y0] | ae(v) |
| if( merge_subblock_flag[x0][y0] == 1 ) { | |
| if( MaxNumSubblockMergeCand > 1 ) | |
| **merge_subblock_idx**[x0][y0] | ae(v) |
| } else { | |

FIG. 16

| | **Descriptor** |
|---|---|
| if( sps_ciip_enabled_flag && cu_skip_flag[x0][y0] == 0 && (cbWidth*cbHeight) >= 64 && cbWidth < 128 && cbHeight < 128 ) { | |
| **ciip_flag**[x0][y0] | ae(v) |
| if( ciip_flag[x0][y0] && MaxNumMergeCand > 1 ) | |
| **merge_idx**[x0][y0] | ae(v) |
| } | |
| if( MergeTriangleFlag[x0][y0] ) { | |
| **merge_triangle_split_dir**[x0][y0] | ae(v) |
| **merge_triangle_idx0**[x0][y0] | ae(v) |
| **merge_triangle_idx1**[x0][y0] | ae(v) |
| } | |
| } | |
| } | |
| } | |
| } | |
| } | |

FIG. 16 (cont.)

MOTION VECTOR PREDICTION FOR VIDEO CODING

CROSS-REFERENCE TO RELATED APPLICATIONS

This application is a continuation of U.S. patent application Ser. No. 17/139,837, filed on Dec. 31, 2020, which is a continuation of International Application No. PCT/CN2019/094429, filed on Jul. 2, 2019, which claims priority to U.S. Provisional Patent Application No. 62/693,444, filed on Jul. 2, 2018 and U.S. Provisional Patent Application No. 62/694,451, filed on Jul. 6, 2018 and U.S. Provisional Patent Application No. 62/699,750, filed on Jul. 18, 2018. All of the afore-mentioned patent applications are hereby incorporated by reference in their entireties.

TECHNICAL FIELD

This application relates to the field of video coding technologies, and in particular, to a motion vector prediction method and apparatus, and a corresponding encoder and decoder.

BACKGROUND

With development of information technologies, video services such as high definition television, web conferencing, IPTV, and 3D television rapidly develop. Video signals, by virtue of advantages such as intuitiveness and high efficiency, become a most important manner of obtaining information in people's daily life. The video signals contain a large amount of data, and therefore occupy a large amount of transmission bandwidth and storage space. To effectively transmit and store the video signals, the video signals need to be compressed and encoded. A video compression technology has increasingly become an indispensable key technology in the field of video application.

SUMMARY

Embodiments of the present disclosure disclose a video encoder, a video decoder, and corresponding methods. Specific implementations are clear based on descriptions of claims, this specification, and accompanying drawings in this application.

According to a first aspect, the present disclosure relates to a decoding method or a motion vector prediction method. The method includes: obtaining a construction mode of a candidate motion information list that includes optimal candidate motion information of a current coding block, and obtaining an index of the optimal candidate motion information in the candidate motion information list, where the construction mode of the candidate motion information list is a mode of constructing a block-based candidate motion information list or a mode of constructing a subblock-based candidate motion information list; constructing the candidate motion information list in the construction mode; determining optimal motion information from the constructed candidate motion information list based on the index; and predicting the current coding block based on the optimal motion information.

It should be understood that, in a current technology, the current coding block may be partitioned into smaller subblocks. For example, the current coding block may be partitioned, through iteration, using quad-tree (QT) partitioning, binary-tree (BT) partitioning, or triple-tree (TT), or any combination thereof. In other words, one coding block may be split into smaller subblocks.

In this method, candidate motion information lists of the current block (in some cases, due to differences in language habits, the current coding block may refer to a current picture block, a current encoding block, a current decoding block, a current to-be-encoded block, a current to-be-decoded block, or the like, and the names should not constitute any limitation on the present disclosure) are classified. Candidate motion information is classified into candidate motion information obtained through block-based prediction and candidate motion information obtained through subblock-based prediction. A block-based candidate motion information list and a subblock-based candidate motion information list are constructed. This can effectively reduce transmission costs of the optimal candidate motion information.

According to the first aspect, in a possible implementation process, the obtaining a construction mode of a candidate motion information list that includes optimal candidate motion information of a current block includes: obtaining an identifier that is used to determine the candidate motion information list, where an inter prediction mode used for the current block is a merge mode, and when the identifier is a first feature value, the construction mode of the candidate motion information list is the mode of constructing the block-based candidate motion information list, or when the identifier is a second feature value, the construction mode of the candidate motion information list is the mode of constructing the subblock-based candidate motion information list. It should be understood that the first feature value and the second feature value are names used to represent two values, and do not constitute any limitation.

Optionally, the first feature value may be 0 or 1, and the second feature value may be 1 or 0. Optionally, the identifier may be represented as, for example, list-idx. However, this is not limited. Optionally, the candidate motion information list constructed in a block-based mode may be represented as a list0 (or list1), and the candidate motion information list constructed in a subblock-based mode may be represented as a list1 (or list0). It should be understood that specific values of the feature values, or specific representation symbols of the identifier and the lists are not limited and not exhaustively described in the present disclosure.

According to the first aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the first aspect, in a possible implementation process, candidate motion information in the block-based candidate motion information list includes at least one of the motion information of the spatially neighboring coded block of the current block or the motion information of the temporally neighboring coded block of the current block. All the candidate motion information in the candidate motion information list may be the motion information of the spatially or temporally neighboring coded block of the current block. Alternatively, some of the candidate motion information may be the motion information of the spatially or temporally neighboring coded block of the current block, and some of the candidate motion information may be motion information obtained in another manner.

According to the first aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the first aspect, in a possible implementation process, the subblock-based candidate motion information list may be constructed in a motion model-based affine model merge (AMM) mode. Motion information of a spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the first aspect, in a possible implementation process, the subblock-based candidate motion information list may be constructed in a control point-based complex merge mode. Motion information of a spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the first aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the first aspect, in a possible implementation process, a width of the current block is greater than or equal to a threshold, and/or a height of the current block is greater than or equal to a threshold. The threshold may be 4, 8, or 16, but this is not limited.

According to the first aspect, in a possible implementation process, if the optimal motion information is motion information in the block-based candidate motion information list, the current block is predicted based on the optimal motion information.

According to the first aspect, in a possible implementation process, if the optimal motion information is motion information in the subblock-based candidate motion information list, at least the following three cases are included.

Case 1: If optimal motion information determined in S23 is obtained in an affine mode (including at least the affine model merge mode or the complex merge mode), motion information corresponding to a subblock of the current block is derived based on the optimal motion information, and the subblock of the current block is predicted. The current block may include a plurality of subblocks, and the subblock of the current block may be any one of the plurality of subblocks. In a possible implementation process, motion information corresponding to each subblock of the current block is derived based on the optimal motion information, and each subblock of the current block is correspondingly predicted.

Case 2: If optimal motion information determined in S23 is obtained in the ATMVP mode, a subblock of the current block is predicted based on the optimal motion information. In a possible implementation process, the optimal candidate motion information may be a combination of motion information and includes motion information corresponding to each subblock of the current block, and each subblock of the current block is correspondingly predicted.

Case 3: If optimal motion information determined in S23 is obtained in the ATMVP mode through an indication, the optimal motion information is obtained based on the corresponding indication, and a subblock of the current block is predicted based on the optimal motion information. In a possible implementation process, the optimal candidate motion information may be obtained based on indication information. Motion information corresponding to each subblock of the current block may be obtained in the ATMVP mode based on the indication information, and each subblock of the current block is correspondingly predicted.

According to a second aspect, the present disclosure relates to a decoding method or a motion vector prediction method. The method includes: obtaining an identifier that is used to determine a candidate motion information list including optimal candidate motion information of a current block, and obtaining an index of the optimal candidate motion information in the candidate motion information list, where an inter prediction mode used for the current block is a merge mode; constructing the candidate motion information list based on the identifier, where when the identifier is a first feature value, the candidate motion information list is a block-based candidate motion information list, or when the identifier is a second feature value, the candidate motion information list is a subblock-based candidate motion information list; determining optimal motion information from the constructed candidate motion information list based on the index; and predicting the current block based on the optimal motion information.

According to the second aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the second aspect, in a possible implementation process, candidate motion information in the block-based candidate motion information list includes at least one of motion information of a spatially neighboring coded block of the current block or motion information of a temporally neighboring coded block of the current block. All the candidate motion information in the candidate motion information list may be the motion information of the spatially or temporally neighboring coded block of the current block. Alternatively, some of the candidate motion information may be the motion information of the spatially or temporally neighboring coded block of the current block, and some of the candidate motion information may be motion information obtained in another manner.

According to the second aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the second aspect, in a possible implementation process, the subblock-based candidate motion information list may be constructed in a motion model-based affine model merge (AMM) mode. Motion information of a spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the second aspect, in a possible implementation process, the subblock-based candidate motion information list may be constructed in a control point-based complex merge mode. Motion information of a spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the second aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the second aspect, in a possible implementation process, a width of the current block is greater than or equal to a threshold, and/or a height of the current block is greater than or equal to a threshold. The threshold may be 4, 8, or 16, but this is not limited.

According to a third aspect, the present disclosure relates to a motion vector prediction method. The method includes: if a size of a current block satisfies a preset sample quantity, obtaining an identifier that is used to determine a candidate motion information list including optimal candidate motion information of the current block, and obtaining an index of the optimal candidate motion information in the candidate motion information list, where an inter prediction mode used for the current block is a merge mode; constructing the candidate motion information list based on the identifier, where when the identifier is a first feature value, constructing a block-based candidate motion information list, or when the identifier is a second feature value, constructing a subblock-based candidate motion information list; determining optimal motion information from the constructed candidate motion information list based on the index; and predicting the current block based on the optimal motion information.

According to the third aspect, in a possible implementation process, if the size of the current block does not satisfy the preset sample quantity, constructing the block-based candidate motion information list, and obtaining the index of the optimal candidate motion information in the candidate motion information list, where the inter prediction mode used for the current block is the merge mode; determining the optimal motion information from the constructed candidate motion information list based on the obtained index; and predicting the current block based on the optimal motion information.

An inventive concept of this solution is as follows: first, determining whether the current block satisfies a preset condition; and if the current block satisfies the preset condition, obtaining an identifier that can indicate the candidate motion information list including the optimal candidate motion information of the current block, and constructing the block-based candidate motion information list or the subblock-based candidate motion information list based on the identifier; or if the current block does not satisfy the preset condition, constructing only the block-based candidate motion information list; determining the optimal candidate motion information from the constructed candidate motion information list based on the obtained motion information index; and predicting the current block.

According to the third aspect, in a possible implementation process, whether the current block satisfies the preset condition includes but is not limited to: Whether the size of the current block satisfies the preset sample quantity.

According to the third aspect, in a possible implementation process, that a size of a current block satisfies a preset sample quantity includes: A width of the current block is greater than or equal to a threshold, and/or a height of the current block is greater than or equal to a threshold.

Optionally, when the size of the current block satisfies the preset sample quantity is that the width of the current block is greater than or equal to a threshold, that the size of the current block does not satisfy the preset sample quantity is that the width of the current block is less than the threshold; when the size of the current block satisfies the preset sample quantity is that the height of the current block is greater than or equal to a threshold, that the size of the current block does not satisfy the preset sample quantity is that the height of the current block is less than the threshold; when the size of the current block satisfies the preset sample quantity is that the width of the current block is greater than or equal to a threshold or the height of the current block is greater than or equal to another threshold, that the size of the current block does not satisfy the preset sample quantity is that the width of the current block is less than the threshold and the height of the current block is less than the another threshold; or when the size of the current block satisfies the preset sample quantity is that the width of the current block is greater than or equal to a threshold and the height of the current block is greater than or equal to another threshold, that the size of the current block does not satisfy the preset sample quantity is that the width of the current block is less than the threshold or the height of the current block is less than the another threshold. The threshold may be 4, 8, or 16, but this is not limited. It should be understood that this logic is merely an example and does not constitute any limitation. In addition, a relationship between the width and the height is not limited in the present disclosure, either.

According to the third aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the third aspect, in a possible implementation process, all candidate motion information in the obtained block-based candidate motion information list may be the motion information of the spatially or temporally neighboring coded block of the current block. Alternatively, some of candidate motion information may be the motion information of the spatially or temporally neighboring coded block of the current block, and some of the candidate motion information may be motion information obtained in another manner.

According to the third aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the third aspect, in a possible implementation process, the subblock-based candidate motion information list may be constructed in a motion model-based affine model merge (AMM) mode. The motion information of the spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the third aspect, in a possible implementation process, the subblock-based candidate motion information list may be constructed in a control point-based complex merge mode. The motion information of the spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the third aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

The foregoing method may be performed by a motion vector prediction apparatus or device. Optionally, the present disclosure correspondingly provides apparatuses in a fourth aspect, a fifth aspect, and a sixth aspect according to the first aspect, the second aspect, and the third aspect.

According to the fourth aspect, the present disclosure relates to a decoding apparatus or a motion vector prediction apparatus. The apparatus includes: an obtaining module, configured to obtain a construction mode of a candidate motion information list that includes optimal candidate motion information of a current block, and obtain an index of the optimal candidate motion information in the candidate motion information list, where the construction mode of the candidate motion information list is a mode of constructing a block-based candidate motion information list or a mode of constructing a subblock-based candidate motion information list; a construction module, configured to construct the candidate motion information list in the construction mode; a determining module, configured to determine optimal motion information from the constructed candidate motion information list based on the index; and a prediction module, configured to predict the current block based on the optimal motion information.

According to the fourth aspect, in a possible implementation process, the obtaining module is configured to: obtain an identifier that is used to determine the candidate motion information list, where an inter prediction mode used for the current block is a merge mode; and when the identifier is a first feature value, the construction mode of the candidate motion information list is the mode of constructing the block-based candidate motion information list, or when the identifier is a second feature value, the construction mode of the candidate motion information list is the mode of constructing the subblock-based candidate motion information list.

Optionally, the first feature value may be 0 or 1, and the second feature value may be 1 or 0. Optionally, the identifier may be represented as, for example, list-idx. However, this is not limited. Optionally, the candidate motion information list constructed in a block-based mode may be represented as a list (or list1), and the candidate motion information list constructed in a subblock-based mode may be represented as a list1 (or list0). It should be understood that specific values of the feature values, or specific representation symbols of the identifier and the lists are not limited and not exhaustively described in the present disclosure.

According to the fourth aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the fourth aspect, in a possible implementation process, candidate motion information in the block-based candidate motion information list includes at least one of the motion information of the spatially neighboring coded block of the current block or the motion information of the temporally neighboring coded block of the current block. All the candidate motion information in the candidate motion information list may be the motion information of the spatially or temporally neighboring coded block of the current block. Alternatively, some of the candidate motion information may be the motion information of the spatially or temporally neighboring coded block of the current block, and some of the candidate motion information may be motion information obtained in another manner.

According to the fourth aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the fourth aspect, in a possible implementation process, the subblock-based candidate motion information list may be constructed in a motion model-based affine model merge (AMM) mode. The motion information of the spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the fourth aspect, in a possible implementation process, the subblock-based candidate motion information list may be constructed in a control point-based complex merge mode. The motion information of the spatially neighboring coded block of the current coding block is added into a candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the fourth aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the fourth aspect, in a possible implementation process, a width of the current block is greater than or equal to a threshold, and/or a height of the current block is greater than or equal to a threshold. The threshold may be 4, 8, or 16, but this is not limited.

According to the fifth aspect, the present disclosure relates to a decoding apparatus or a motion vector prediction apparatus. The apparatus includes: an obtaining module, configured to obtain an identifier that is used to determine a candidate motion information list including optimal candidate motion information of a current block and obtain an index of the optimal candidate motion information in the candidate motion information list, where an inter prediction mode used for the current block is a merge mode; a construction module, configured to construct the candidate motion information list based on the identifier, where when the identifier is a first feature value, the candidate motion information list is a block-based candidate motion information list, or when the identifier is a second feature value, the candidate motion information list is a subblock-based candidate motion information list; a determining module, configured to determine optimal motion information from the constructed candidate motion information list based on the index; and a prediction module, configured to predict the current block based on the optimal motion information.

According to the fifth aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the fifth aspect, in a possible implementation process, candidate motion information in the block-based candidate motion information list includes at least one of motion information of a spatially neighboring coded block of the current block or motion information of a temporally neighboring coded block of the current block. All the candidate motion information in the candidate motion information list may be the motion information of the spatially or temporally neighboring coded block of the current block. Alternatively, some of the candidate motion information may be the motion information of the spatially or temporally neighboring coded block of the current block, and some of the candidate motion information may be motion information obtained in another manner.

According to the fifth aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the fifth aspect, in a possible implementation process, the subblock-based candidate motion information list may be constructed in a motion model-based affine model merge (AMM) mode. The motion information of the spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the fifth aspect, in a possible implementation process, the subblock-based candidate motion information list may be constructed in a control point-based complex merge mode. The motion information of the spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the fifth aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the fifth aspect, in a possible implementation process, a width of the current block is greater than or equal to a threshold, and/or a height of the current block is greater than or equal to a threshold. The threshold may be 4, 8, or 16, but this is not limited.

According to the sixth aspect, the present disclosure relates to a decoding apparatus or a motion vector prediction apparatus. The apparatus includes: an obtaining module, configured to: when a size of a current block satisfies a preset sample quantity, obtain an identifier of a candidate motion information list that includes optimal candidate motion information of the current block, and obtain an index of the optimal candidate motion information in the candidate motion information list, where an inter prediction mode used for the current block is a merge mode; a construction module, configured to construct the candidate motion information list based on the identifier; and when the identifier is a first feature value, construct a block-based candidate motion information list; or when the identifier is a second feature value, construct a subblock-based candidate motion information list; a determining module, configured to determine optimal motion information from the constructed candidate motion information list based on the index; and a prediction module, configured to predict the current block based on the optimal motion information.

According to the sixth aspect, in a possible implementation process, the construction module is further configured to: when the size of the current block does not satisfy the preset sample quantity, construct the block-based candidate motion information list, where the inter prediction mode used for the current block is the merge mode.

According to the sixth aspect, in a possible implementation process, whether the current block satisfies a preset condition includes but is not limited to: Whether the size of the current block satisfies the preset sample quantity.

According to the sixth aspect, in a possible implementation process, that a size of a current block satisfies a preset sample quantity includes: A width of the current block is greater than or equal to a threshold, and/or a height of the current block is greater than or equal to a threshold.

Optionally, when the size of the current block satisfies the preset sample quantity is that the width of the current block is greater than or equal to a threshold, that the size of the current block does not satisfy the preset sample quantity is that the width of the current block is less than the threshold; when the size of the current block satisfies the preset sample quantity is that the height of the current block is greater than or equal to a threshold, that the size of the current block does not satisfy the preset sample quantity is that the height of the current block is less than the threshold; when the size of the current block satisfies the preset sample quantity is that the width of the current block is greater than or equal to a threshold or the height of the current block is greater than or equal to another threshold, that the size of the current block does not satisfy the preset sample quantity is that the width of the current block is less than the threshold and the height of the current block is less than the another threshold; or when the size of the current block satisfies the preset sample quantity is that the width of the current block is greater than or equal to a threshold and the height of the current block is greater than or equal to another threshold, that the size of the current block does not satisfy the preset sample quantity is that the width of the current block is less than the threshold or the height of the current block is less than the another threshold. The threshold may be 4, 8, or 16, but this is not limited. It should be understood that this logic is merely an example and does not constitute any limitation. In addition, a relationship between the width and the height is not limited in the present disclosure, either.

According to the sixth aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the sixth aspect, in a possible implementation process, all candidate motion information in the obtained block-based candidate motion information list may be the motion information of the spatially or temporally neighboring coded block of the current block. Alternatively, some of candidate motion information may be the motion information of the spatially or temporally neighboring coded block of the current block, and some of the candidate motion information may be motion information obtained in another manner.

According to the sixth aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the sixth aspect, in a possible implementation process, the subblock-based candidate motion information list may be constructed in a motion model-based affine model merge (AMM) mode. The motion information of the spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the sixth aspect, in a possible implementation process, the subblock-based candidate motion information list may be constructed in a control point-based complex merge mode. The motion information of the spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the sixth aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to a seventh aspect, the present disclosure relates to a decoding method or a motion vector prediction method. The method includes: parsing a bitstream to obtain a syntax element, where the syntax element includes at least an index of optimal candidate motion information of a current block; determining, based on the syntax element, to construct a first list or a second list for the current picture block, where the first list is a block-based candidate motion information list, and the second list is a subblock-based candidate motion information list; determining optimal motion information from the first list or the second list based on the index; and predicting the current block based on the optimal motion information.

According to the seventh aspect, in a possible implementation process, the block-based candidate motion information list is a candidate motion information list constructed in a conventional merge (which may also be expressed as general_merge or regular_merge in some scenarios) mode.

According to the seventh aspect, in a possible implementation process, the conventional merge mode includes a mode defined according to an HEVC standard or an evolved version of the HEVC standard. In examples, the block-based candidate motion information list includes a candidate motion information list that is constructed in the conventional merge mode defined according to the HEVC standard or the evolved version of the HEVC standard.

According to the seventh aspect, in a possible implementation process, the candidate motion information in the first list includes one or more of motion information of a spatially neighboring block on upper-left of the current picture block, motion information of a spatially neighboring block to the left of the current picture block, motion information of a spatially neighboring block lower-left of the current picture block, motion information of a spatially neighboring block on upper-right of the current picture block, or motion information of a spatially neighboring block to the right of the current picture block.

According to the seventh aspect, in a possible implementation process, the subblock-based candidate motion information list is a candidate motion information list constructed in a subblock-based merge (merge_subblock) mode.

According to the seventh aspect, in a possible implementation process, the subblock-based merge mode includes at least one of affine model merge, complex merge, or ATMVP. In examples, the subblock-based candidate motion information list includes a candidate motion information list that is constructed in at least one subblock-based merge mode of affine model merge, complex merge, or ATMVP.

According to the seventh aspect, in a possible implementation process, the subblock-based candidate motion information list includes a candidate motion information list that is constructed only in a subblock-based merge mode of ATMVP.

According to the seventh aspect, in a possible implementation process, all candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the seventh aspect, in a possible implementation process, the subblock-based candidate motion information list may be constructed in a motion model-based affine model merge (AMM) mode. Motion information of a spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the seventh aspect, in a possible implementation process, the subblock-based candidate motion information list may be constructed in a control point-based complex merge mode. Motion information of a spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the seventh aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the seventh aspect, in a possible implementation process, the syntax element includes a list index, and the determining, based on the syntax element, to construct a first list or a second list for the current picture block includes: obtaining a candidate motion information list index, where when the list index is a first feature value, it indicates to construct the first list for the current picture block, or when the list index is a second feature value, it indicates to construct the second list for the current picture block.

According to the seventh aspect, in a possible implementation process, the syntax element further includes indication information used to indicate a conventional merge mode used for the current block or indication information used to indicate a subblock-based merge mode used for the current block.

According to the seventh aspect, in a possible implementation process, the syntax element further includes indication information used to indicate that the block-based candidate motion information list is used for the current block or indication information used to indicate that the subblock-based candidate motion information list is used for the current block.

According to the seventh aspect, in a possible implementation process, the first feature value may be 0 or 1, and the second feature value may be 1 or 0. Optionally, the identifier may be represented as, for example, list-idx. However, this is not limited. Optionally, the candidate motion information list constructed in a block-based mode may be represented as a list0 (or list1), and the candidate motion information list constructed in a subblock-based mode may be represented as a list1 (or list0). It should be understood that specific values of the feature values, or specific representation symbols of the identifier and the lists are not limited and not exhaustively described in the present disclosure.

According to the seventh aspect, in a possible implementation process, a width of the current block is greater than or equal to a threshold, and/or a height of the current block is greater than or equal to a threshold. The threshold may be 4, 8, or 16, but this is not limited.

According to the seventh aspect, in a possible implementation process, if the optimal motion information is motion information in the block-based candidate motion information list, the current block is predicted based on the optimal motion information.

According to the seventh aspect, in a possible implementation process, if the optimal motion information is motion information in the subblock-based candidate motion information list, at least the following three cases are included.

Case 1: If optimal motion information determined in S23 is obtained in an affine mode (including at least the affine model merge mode or the complex merge mode), motion information corresponding to a subblock of the current block is derived based on the optimal motion information, and the subblock of the current block is predicted. The current block may include a plurality of subblocks, and the subblock of the current block may be any one of the plurality of subblocks. In a possible implementation process, motion information corresponding to each subblock of the current block is derived based on the optimal motion information, and each subblock of the current block is correspondingly predicted.

Case 2: If optimal motion information determined in S23 is obtained in the ATMVP mode, a subblock of the current block is predicted based on the optimal motion information. In a possible implementation process, the optimal candidate motion information may be a combination of motion information and includes motion information corresponding to each subblock of the current block, and each subblock of the current block is correspondingly predicted.

Case 3: If optimal motion information determined in S23 is obtained in the ATMVP mode through an indication, the optimal motion information is obtained based on the corresponding indication, and a subblock of the current block is predicted based on the optimal motion information. In a possible implementation process, the optimal candidate motion information may be obtained based on indication information. Motion information corresponding to each subblock of the current block may be obtained in the ATMVP mode based on the indication information, and each subblock of the current block is correspondingly predicted.

According to an eighth aspect, the present disclosure relates to a decoding apparatus or a motion vector prediction apparatus. The apparatus includes: an obtaining module, configured to parse a bitstream to obtain a syntax element, where the syntax element includes at least an index of optimal candidate motion information of a current block; a construction module, configured to determine, based on the syntax element, to construct a first list or a second list for the current picture block, where the first list is a block-based candidate motion information list, and the second list is a subblock-based candidate motion information list; a determining module, configured to determine optimal motion information from the first list or the second list based on the index; and a prediction module, configured to predict the current block based on the optimal motion information.

According to the eighth aspect, in a possible implementation process, the block-based candidate motion information list is a candidate motion information list constructed in a conventional merge (which may also be expressed as general_merge or regular_merge in some scenarios) mode.

According to the eighth aspect, in a possible implementation process, the conventional merge mode includes a mode defined according to an HEVC standard or an evolved version of the HEVC standard. In examples, the block-based candidate motion information list includes a candidate motion information list that is constructed in the conventional merge mode defined according to the HEVC standard or the evolved version of the HEVC standard.

According to the eighth aspect, in a possible implementation process, the candidate motion information in the first list includes one or more of motion information of a spatially neighboring block on upper-left of the current picture block, motion information of a spatially neighboring block to the left of the current picture block, motion information of a spatially neighboring block lower-left of the current picture block, motion information of a spatially neighboring block on upper-right of the current picture block, or motion information of a spatially neighboring block to the right of the current picture block.

According to the eighth aspect, in a possible implementation process, the subblock-based candidate motion information list is a candidate motion information list constructed in a subblock-based merge (merge_subblock) mode.

According to the eighth aspect, in a possible implementation process, the subblock-based merge mode includes at least one of affine model merge, complex merge, or ATMVP. In examples, the subblock-based candidate motion information list includes a candidate motion information list that is constructed in at least one subblock-based merge mode of affine model merge, complex merge, or ATMVP.

According to the eighth aspect, in a possible implementation process, the subblock-based candidate motion information list includes a candidate motion information list that is constructed only in a subblock-based merge mode of ATMVP.

According to the eighth aspect, in a possible implementation process, all candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the eighth aspect, in a possible implementation process, the subblock-based candidate motion information list may be constructed in a motion model-based affine model merge (AMM) mode. Motion information of a spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the eighth aspect, in a possible implementation process, the subblock-based candidate motion information list may be constructed in a control point-based complex merge mode. Motion information of a spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the eighth aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the eighth aspect, in a possible implementation process, the syntax element includes a list index, and the construction module is configured to: obtain a candidate motion information list index, where when the list index is a first feature value, it indicates to construct the first list for the current picture block, or when the list index is a second feature value, it indicates to construct the second list for the current picture block.

According to the eighth aspect, in a possible implementation process, the syntax element further includes indication information used to indicate a conventional merge mode used for the current block or indication information used to indicate a subblock-based merge mode used for the current block.

According to the eighth aspect, in a possible implementation process, the syntax element further includes indication information used to indicate that the block-based candidate motion information list is used for the current block or indication information used to indicate that the subblock-based candidate motion information list is used for the current block.

According to the eighth aspect, in a possible implementation process, the first feature value may be 0 or 1, and the second feature value may be 1 or 0. Optionally, the identifier may be represented as, for example, list-idx. However, this is not limited. Optionally, the candidate motion information list constructed in a block-based mode may be represented as a list0 (or list1), and the candidate motion information list constructed in a subblock-based mode may be represented as a list1 (or list0). It should be understood that specific values of the feature values, or specific representation symbols of the identifier and the lists are not limited and not exhaustively described in the present disclosure.

According to the eighth aspect, in a possible implementation process, a width of the current block is greater than or equal to a threshold, and/or a height of the current block is greater than or equal to a threshold. The threshold may be 4, 8, or 16, but this is not limited.

According to a ninth aspect, the present disclosure relates to an encoding method or a motion vector prediction method. The method includes: constructing a first list, where the first list is a block-based candidate motion information list; constructing a second list, where the second list is a subblock-based candidate motion information list; determining optimal candidate motion information from the first candidate motion information list and the second candidate motion information list; and predicting the current block based on the optimal motion information.

According to the ninth aspect, in a possible implementation process, the method further includes: obtaining an identifier that is used to determine a candidate motion information list including optimal candidate motion information of a current block, and obtaining an index of the optimal candidate motion information in the candidate motion information list, where an inter prediction mode used for the current block is a merge mode, and when the identifier is a first feature value, the candidate motion information list is the first list, or when the identifier is a second feature value, the candidate motion information list is the second list; and encoding the identifier and the index into a bitstream.

According to a tenth aspect, the present disclosure relates to an encoding method or a motion vector prediction method. The method includes: obtaining an identifier that is used to determine a candidate motion information list including optimal candidate motion information of a current block, and obtaining an index of the optimal candidate motion information in the candidate motion information list, where an inter prediction mode used for the current block is a merge mode, and when the identifier is a first feature value, the candidate motion information list a block-based candidate motion information list, or when the identifier is a second feature value, the candidate motion information list is a subblock-based candidate motion information list; and encoding the identifier and the index into a bitstream.

According to an eleventh aspect, the present disclosure relates to an encoding method or a motion vector prediction method. The method includes: if a size of a current block satisfies a preset sample quantity, constructing a first list and a second list, where the first list is a block-based candidate motion information list, the second list is a subblock-based candidate motion information list, and an inter prediction mode used for the current block is a merge mode; determining optimal candidate motion information from the first list and the second list; and predicting the current block based on the optimal motion information.

According to the eleventh aspect, in a possible implementation process, the method further includes: if the size of the current block satisfies the preset sample quantity, constructing the first list, where the first list is the block-based candidate motion information list, and the inter prediction mode used for the current block is the merge mode; determining the optimal candidate motion information from the first list; and predicting the current block based on the optimal motion information.

According to a twelfth aspect, the present disclosure relates to an encoding apparatus or a motion vector prediction apparatus. The apparatus includes: a construction module, configured to construct a first list and a second list, where the first list is a block-based candidate motion information list, and the second list is a subblock-based candidate motion information list; a determining module, configured to determine optimal candidate motion information from the first candidate motion information list and the second candidate motion information list; and a prediction module, configured to predict the current block based on the optimal motion information.

According to the twelfth aspect, in a possible implementation process, the apparatus further includes: an obtaining module, configured to obtain an identifier that is used to determine a candidate motion information list including optimal candidate motion information of a current block, and obtain an index of the optimal candidate motion information in the candidate motion information list, where an inter prediction mode used for the current block is a merge mode, and when the identifier is a first feature value, the candidate motion information list is the first list, or when the identifier is a second feature value, the candidate motion information list is the second list; and an encoding module, configured to encode the identifier and the index into a bitstream.

According to a thirteenth aspect, the present disclosure relates to an encoding apparatus or a motion vector prediction apparatus. The apparatus includes: an obtaining module, configured to obtain an identifier that is used to determine a candidate motion information list including optimal candidate motion information of a current block, and obtain an index of the optimal candidate motion information in the candidate motion information list, where an inter prediction mode used for the current block is a merge mode, and when the identifier is a first feature value, the candidate motion information list a block-based candidate motion information list, or when the identifier is a second feature value, the candidate motion information list is a subblock-based candidate motion information list; and an encoding module, configured to encode the identifier and the index into a bitstream.

According to a fourteenth aspect, the present disclosure relates to an encoding apparatus or a motion vector prediction apparatus. The apparatus includes: a construction module, configured to: if a size of a current block satisfies a preset sample quantity, construct a first list and a second list, where the first list is a block-based candidate motion information list, the second list is a subblock-based candidate motion information list, and an inter prediction mode used for the current block is a merge mode; a determining module, configured to determine optimal candidate motion information from the first list and the second list; and a prediction module, configured to predict the current block based on the optimal motion information.

According to the fourteenth aspect, in a possible implementation process, the construction module is further configured to: if the size of the current block satisfies the preset sample quantity, construct the first list, where the first list is the block-based candidate motion information list, and the inter prediction mode used for the current block is the merge mode.

According to the ninth aspect to the fourteenth aspect (including any one of the ninth aspect, the tenth aspect, the eleventh aspect, the twelfth aspect, the thirteenth aspect, and the fourteenth aspect), in a possible implementation process, the first feature value may be 0 or 1, and the second feature value may be 1 or 0. Optionally, the identifier may be represented as, for example, list-idx. However, this is not limited. Optionally, the candidate motion information list constructed in a block-based mode may be represented as a list0 (or list1), and the candidate motion information list constructed in a subblock-based mode may be represented as a list1 (or list0). It should be understood that specific values of the feature values, or specific representation symbols of the identifier and the lists are not limited and not exhaustively described in the present disclosure.

According to the ninth aspect to the fourteenth aspect, in a possible implementation process, the block-based candidate motion information list includes a candidate motion information list that is constructed in a merge mode defined according to an HEVC standard or an evolved version of the HEVC standard. For example, motion information of a spatially or temporally neighboring coded block of the current coding block is added into the candidate motion information list according to a preset rule. For some possible construction modes, refer to related descriptions in Embodiment S11.1.

According to the ninth aspect to the fourteenth aspect, in a possible implementation process, candidate motion information in the block-based candidate motion information list includes at least one of motion information of a spatially neighboring coded block of the current block or motion information of a temporally neighboring coded block of the current block. All the candidate motion information in the candidate motion information list may be the motion information of the spatially or temporally neighboring coded block of the current block. Alternatively, some of the candidate motion information may be the motion information of the spatially or temporally neighboring coded block of the current block, and some of the candidate motion information may be motion information obtained in another manner.

According to the ninth aspect to the fourteenth aspect, in a possible implementation process, the subblock-based candidate motion information list includes a candidate motion information list that is constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. This is not enumerated or described in detail in the present disclosure.

According to the ninth aspect to the fourteenth aspect, in a possible implementation process, the subblock-based candidate motion information list may be constructed in a motion model-based affine model merge (AMM) mode. The motion information of the spatially neighboring coded block of the current coding block is added into the candidate motion information list according to a preset rule. An implementation method is for example, but not limited to the following: first finding an affine coded block, obtaining motion information of a control point of the affine coded block, deriving motion information of the upper-left vertex and motion information of the upper-right vertex of the current coding block according to an affine transformation model, and sequentially inserting motion information corresponding to an available location block into the candidate motion information list after checking availability and removing repeated items. For some possible construction modes, refer to related descriptions in Embodiment S12.1.

According to the ninth aspect to the fourteenth aspect, in a possible implementation process, the subblock-based candidate motion information list may be constructed in a control point-based complex merge mode. The motion information of the spatially neighboring coded block of the current coding block is added into the candidate motion information list according to a preset rule. An implementation method is, for example, but is not limited to: obtaining motion information of each control point through derivation, combining the motion information of the control points to obtain non-translational (affine model-based) motion information, traversing, in a preconfigured sequence, these models obtained by combining the motion information of the control points, checking availability of candidate motion information in a valid model and removing repeated items, and inserting, into the candidate motion information list, motion information excluding repeated and unqualified information. For some possible construction modes, refer to related descriptions in Embodiment S12.2.

According to the ninth aspect to the fourteenth aspect, in a possible implementation process, the subblock-based candidate motion information list may be constructed in an advanced temporal motion vector prediction (ATMVP) mode. In examples, ATMVP candidate motion information is added into the candidate motion information list according to a preset rule. An implementation method is for example but not limited to: first, determining a collocated reference picture, then, splitting a current coding unit (the current block) into coding subunits (coding subblocks) each with a size of M×N, obtaining motion information of a center point location sample of a coding subunit that corresponds to each current coding subunit and that is in the collocated reference picture, scaling the motion information, converting the motion information into motion information of each current coding subunit, and sequentially inserting motion information corresponding to an available location block into the candidate motion information list after checking availability and removing repeated items. For some possible construction modes, refer to related descriptions in Embodiment S12.3.

According to the ninth aspect to the fourteenth aspect, in a possible implementation process, a width of the current block is greater than or equal to a threshold, and/or a height of the current block is greater than or equal to a threshold. The threshold may be 4, 8, or 16, but this is not limited.

It should be understood that other features and implementations of the foregoing possible methods according to the present disclosure may depend on functionalities of corresponding apparatuses provided in the present disclosure and different implementations.

According to a fifteenth aspect, the present disclosure relates to a motion vector prediction method. The method includes: obtaining index information of optimal candidate motion information of a current block; constructing a candidate motion information list based on the index information, where a mode of obtaining a motion vector included in the candidate motion information list varies with a field of the index information; determining an optimal motion vector in the candidate motion information list based on the index information; and predicting the current block based on the optimal motion vector.

According to the fifteenth aspect, in a possible implementation process, when the index information is a first feature value, the candidate motion information list includes a candidate motion vector obtained in at least one of an HEVC mode or a non-adjacent mode.

According to the fifteenth aspect, in a possible implementation process, when the index information is a second feature value, the candidate motion information list includes a candidate motion vector obtained in at least one of an AFFINE mode, an ATMVP mode, an STMVP mode, or a planar mode.

According to the fifteenth aspect, in a possible implementation process, when the index information is a third feature value, the candidate motion information list includes a candidate motion vector obtained in at least one of an HEVC mode, a non-adjacent mode, an ATMVP mode, or an STMVP mode.

According to the fifteenth aspect, in a possible implementation process, when the index information is a fourth feature value, the candidate motion information list includes a candidate motion vector obtained in at least one of an AFFINE or planar mode.

According to the fifteenth aspect, in a possible implementation process, the obtaining index information of optimal candidate motion information of a current block includes: if the current block satisfies a first preset condition, the obtained index information is used to indicate to construct the candidate motion information list of the current block.

According to the fifteenth aspect, in a possible implementation process, the obtaining index information of optimal candidate motion information of a current block includes: if the current block satisfies a second preset condition, the obtained index information is used to indicate to construct a candidate motion information list of a current subblock, where the current subblock is obtained by splitting the current block.

According to the fifteenth aspect, in a possible implementation process, the obtaining index information of optimal candidate motion information of a current block includes: if the current block does not satisfy the first preset condition, parsing a bitstream to obtain an index of the candidate motion information list including the optimal candidate motion information.

According to a sixteenth aspect, the present disclosure relates to a motion vector prediction apparatus. The apparatus includes: an obtaining module, configured to obtain index information of optimal candidate motion information of a current block; a construction module, configured to construct a candidate motion information list based on the index information, where a mode of obtaining a motion vector included in the candidate motion information list varies with a field of the index information; a determining module, configured to determine an optimal motion vector from the candidate motion information list based on the index information; and a prediction module, configured to predict the current block based on the optimal motion vector.

According to the sixteenth aspect, in a possible implementation process, when the index information is a first feature value, the candidate motion information list includes a candidate motion vector obtained in at least one of an HEVC mode or a non-adjacent mode.

According to the sixteenth aspect, in a possible implementation process, when the index information is a second feature value, the candidate motion information list includes a candidate motion vector obtained in at least one of an AFFINE, ATMVP, STMVP, or planar mode.

According to the sixteenth aspect, in a possible implementation process, when the index information is a third feature value, the candidate motion information list includes a candidate motion vector obtained in at least one of an HEVC mode, a non-adjacent mode, an ATMVP mode, or an STMVP mode.

According to the sixteenth aspect, in a possible implementation process, when the index information is a fourth feature value, the candidate motion information list includes a candidate motion vector obtained in at least one of an AFFINE mode or a planar mode.

According to a seventeenth aspect, the present disclosure relates to a video coding device. The video coding device includes a nonvolatile memory and a processor coupled to each other. The processor invokes program code stored in the memory to perform any one of the foregoing aspects or the possible design methods.

According to an eighteenth aspect, the present disclosure relates to a computer-readable storage medium. The computer-readable storage medium stores a computer program. When the computer program is run on a processor, any one of the foregoing aspects or the possible design methods is implemented.

According to a nineteenth aspect, the present disclosure relates to a decoder, including a memory and a processor. The decoder may be configured to correspondingly implement the decoding method, the decoding apparatus, and the possible implementation solutions in any one of the foregoing aspects.

According to a twentieth aspect, the present disclosure relates to an encoder, including a memory and a processor. The encoder may be configured to correspondingly implement an encoding method, an encoding apparatus, and a possible implementation solution in any one of the foregoing aspects.

It should be understood that functions of the encoder and the decoder may be coupled with each other. Therefore, in some possible cases, a method on a decoder side may correspond to an encoder side, and a method on the encoder side may correspond to the decoder side. Details are not described in the present disclosure.

It should be understood that due to diversity of implementation solutions, the foregoing possible implementations and descriptions may be freely combined without violating combination logic. Beneficial effects obtained in the aspects and corresponding feasible implementations are similar. Details are not described again. Details of one or more embodiments are described in accompanying drawings and the following descriptions. Other features, purposes, and advantages are clear from the specification, the accompanying drawings, and the claims.

BRIEF DESCRIPTION OF DRAWINGS

FIG. 16 shows a syntax table according to an embodiment of the present invention;

DESCRIPTION OF EMBODIMENTS

The following describes the embodiments of this application with reference to the accompanying drawings in the embodiments of this application.

Figure 1:
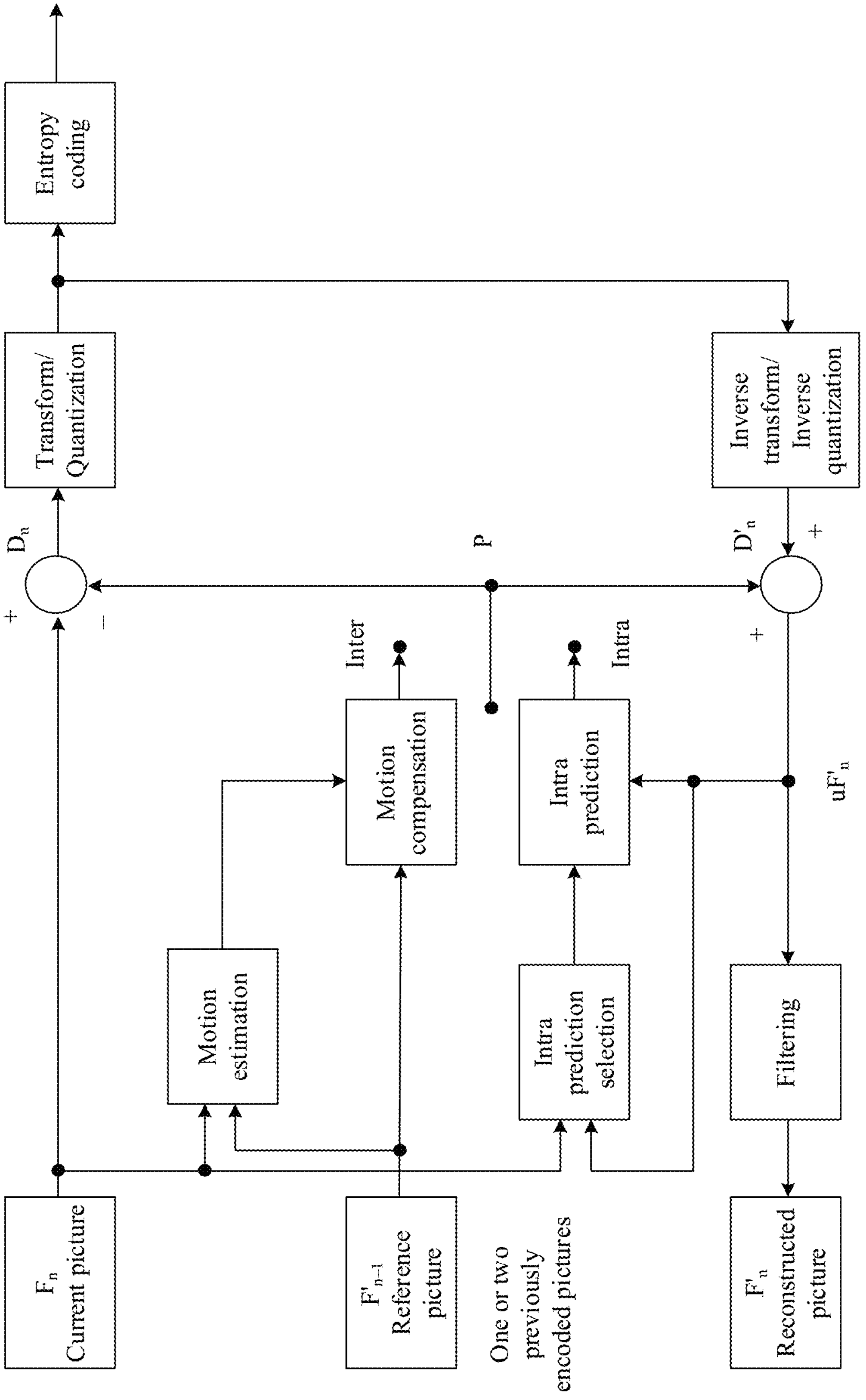
FIG. 1 is a schematic diagram of a video encoding procedure.

As shown in FIG. 1, an encoding process mainly includes the following stages: intra prediction, inter prediction, transform, quantization, entropy encoding, in-loop filtering (mainly de-blocking filtering), and the like. After a picture is split into coding blocks, intra prediction or inter prediction is performed. Then transform and quantization are performed after the residual is obtained. Finally, entropy encoding is performed and a bitstream is output. Herein, a coding block is an array with a size of M×N samples (where M may be equal or unequal to N). In addition, a sample value of each sample location is given.

Intra prediction means predicting a sample value of a sample in a current coding block based on a sample value of a sample in a reconstructed area in a current picture.

Inter prediction means searching a reconstructed picture for a matched reference block for a current coding block in a current picture; using a sample value of a sample in the reference block as prediction information or a predictor (no differentiation is made between the prediction information and the predictor hereinafter) of a sample value of a sample in the current coding block, where this process is referred to as motion estimation (ME) (as shown in FIG. 2B); and transmitting motion information of the current coding block.

It should be noted that the motion information of the current coding block includes prediction direction indication information (generally forward prediction, backward prediction, or bidirectional prediction), one or two motion vectors (MV) pointing to the reference block, and indication information (generally denoted as a reference index) of a picture in which the reference block is located.

Forward prediction means selecting a reference picture from a forward reference picture set, to obtain a reference block for the current coding block. Backward prediction means selecting a reference picture from a backward reference picture set, to obtain a reference block for the current coding block. Bidirectional prediction means selecting a reference picture from a forward reference picture set and a reference picture from a backward reference picture set, to obtain a reference block. When the bidirectional prediction method is used, the current coding block has two reference blocks. Each reference block requires a motion vector and a reference index for an indication. A predictor of a sample value of a sample in the current block is determined based on sample values of samples in the two reference blocks.

In the motion estimation process, the current coding block needs to try a plurality of reference blocks in the reference picture, and a specific reference block or specific blocks that are finally used for prediction is/are determined through rate distortion optimization (RDO) or by using another method.

After the prediction information is obtained through intra prediction or inter prediction, residual information is obtained by subtracting the corresponding prediction information from the sample value of the sample in the current coding block. Then, the residual information is transformed by using a method such as discrete cosine transform (DCT). Then, a bitstream is obtained through quantization and entropy encoding. A filtering operation needs to be performed on a result by adding a predicted signal and a reconstructed residual signal, to obtain a reconstructed signal. The reconstructed signal is used as a reference signal for subsequent encoding.

Figure 3:
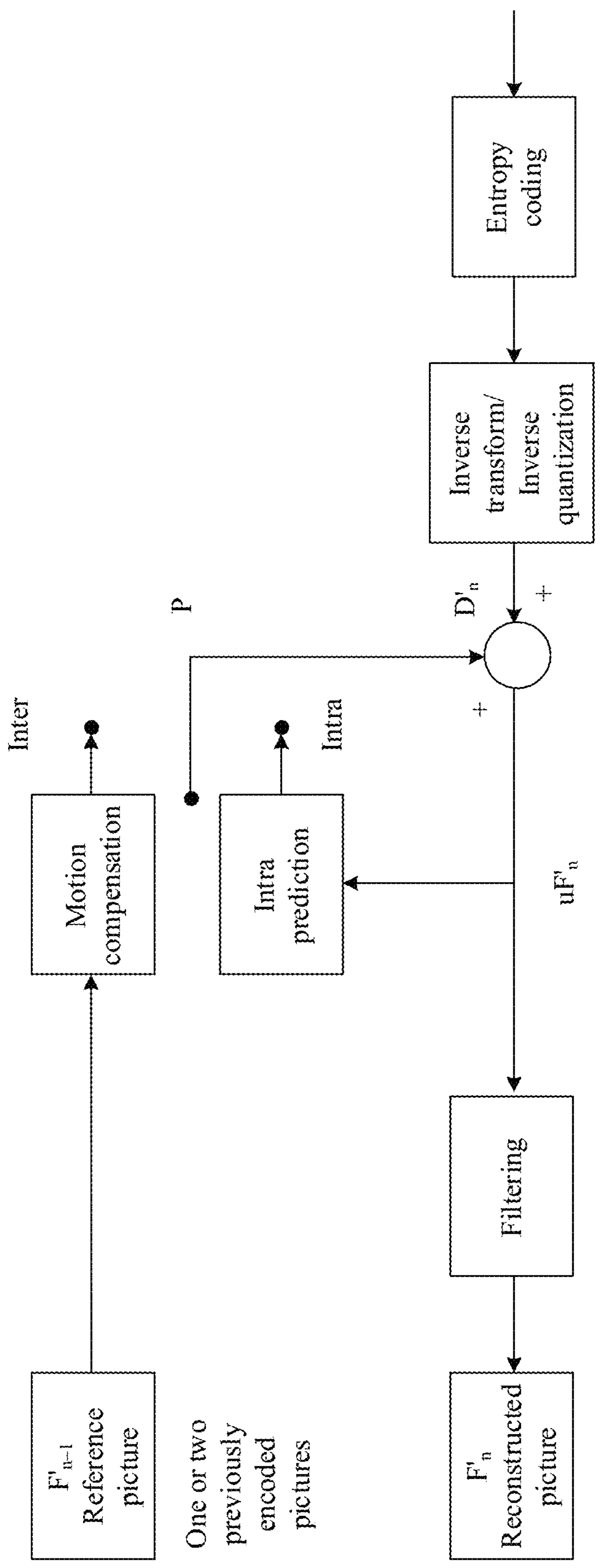
FIG. 3 is a schematic diagram of a video decoding procedure.

Decoding is an inverse process of encoding. For example, as shown in FIG. 3, entropy decoding, inverse quantization, and inverse transform are first performed to obtain the residual information; and the bitstream is decoded to determine whether intra prediction or inter prediction is used for the current coding block. If intra prediction is used, prediction information is constructed based on a sample value of a sample in a reconstructed area around the current coding block by using the intra prediction method. If inter prediction is used, motion information needs to be parsed, a reference block is determined in a reconstructed picture based on the motion information obtained through parsing, and a sample value of a sample in the block is used as prediction information. Such a process is referred to as motion compensation (MC). Reconstructed information may be obtained by performing a filtering operation on a result by adding the prediction information and residual information.

In HEVC, two inter prediction modes are used: an advanced motion vector prediction (AMVP) mode and a merge mode.

In the AMVP mode, a candidate motion vector list is constructed based on motion information of a spatially or temporally neighboring coded block of the current coding block. Then, an optimal motion vector is determined from the candidate motion vector list, and the optimal motion vector is used as a motion vector predictor (MVP) of the current coding block. A rate-distortion cost is calculated according to formula (1), where J represents a rate-distortion cost RD Cost, SAD represents a sum of absolute differences (SAD) between an original sample value and a predicted sample values that is obtained through motion estimation performed by using a candidate motion vector predictor, R represents a bit rate, and λ represents a Lagrange multiplier. An encoder side transfers, to a decoder side, an index value of the selected motion vector predictor in the candidate motion vector list and a reference index value. Further, motion search is performed in an MVP-centric neighboring area, to obtain an actual motion vector of the current coding block. The encoder side transfers a difference (motion vector difference) between the MVP and the actual motion vector to the decoder side.

$$J = SAD + \lambda R \tag{1}$$

Figure 4:
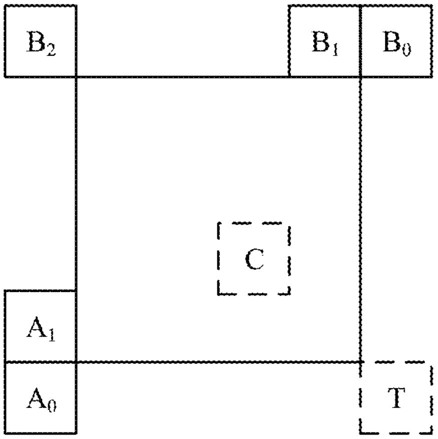
FIG. 4 is a schematic diagram of candidate locations of motion information.

In the merge mode, a candidate motion information list is first constructed based on motion information of a spatially or temporally neighboring coded block of the current coding block; optimal motion information is then determined from the candidate motion information list according to a rate-distortion cost criterion, and the optimal motion information is used as motion information of the current coding block; and an index value (denoted as a merge index, which is also applied to the following description) of a location of the optimal motion information in the candidate motion information list is then transferred to the decoder side. The candidate motion information of the spatially or temporally neighboring coded block of the current coding block is shown in FIG. 4. The spatial candidate motion information is from five spatially neighboring blocks ($A_0$, $A_1$, $B_0$, $B_1$, and $B_2$). If a neighboring block is unavailable or the neighboring block is intra coded, motion information of the neighboring block is not added into the candidate motion information list. The temporal candidate motion information of the current coding block is obtained by scaling an MV of a collocated block in a reference picture based on the reference picture and a picture order count (POC) of a current picture. Whether a block at a location T in the reference picture is available is first determined. If the block is unavailable, a block at a location C is selected.

It can be learned that, the candidate motion vector list (also referred to as a list of candidates, which may be referred to as a candidate list for short) needs to be maintained in both the AMVP mode and the merge mode. Before new motion information is added into the candidate list, whether same motion information already exists in the list is first checked. If the same motion information exists in the list, the motion information is not added into the list. The check process is referred to as pruning of the candidate motion vector list. Pruning of the list prevents existence of same motion information in the list, and this avoids redundant rate-distortion cost calculation.

In HEVC inter prediction, all samples in a coding block use same motion information, and then motion compensation is performed based on the motion information, to obtain predictors of the samples of the coding block. However, in the coding block, not all samples have a same motion characteristic. Using the same motion information may result in inaccuracy of motion compensation prediction and result in more residual information.

In existing video coding standards, block matching motion estimation according to a translational motion model is used, and it is assumed that all samples in a block have consistent motion. However, in the real world, there are a variety of motions. Many objects, for example, a rotating object, a roller coaster rotating in different directions, fireworks, and some stunts in movies, are not in a translational motion. For these moving objects, especially those in a UGC (User Generated Content) scenario, if coding is performed by using a translational motion model-based block motion compensation technology in the existing coding standard, coding efficiency is greatly affected. Therefore, studies on a non-translational motion model have been carried out in the industry and by Huawei. In particular, in-depth studies have been carried out on an affine transformation-based motion model, to further improve the coding efficiency.

Non-translational motion model-based prediction means that, motion information of each motion compensation subunit in the current coding block is derived by using a same motion model on both the encoder side and the decoder side, and motion compensation is performed based on the motion information of the motion compensation subunit to obtain a prediction block, to improve prediction efficiency. Commonly used motion models include a 6-parameter affine transformation model and a 4-parameter affine transformation model.

The 4-parameter affine transformation model is shown in formula (2):

$$\begin{cases} vx = a_1 + a_3x + a_4y \\ vy = a_2 - a_4x + a_3y \end{cases} \quad (2)$$

The 4-parameter affine transformation model may be represented by using motion vectors of two samples and coordinates of the motion vectors relative to a sample of the upper-left vertex of the current coding block, and a sample used to represent a motion model parameter is denoted as a control point. If samples in the upper-left vertex (0, 0) and the upper-right vertex (W, 0) are used as control points, motion vectors ($vx_0$, $vy_0$) and ($vx_1$, $vy_1$) of the control points in the upper-left vertex and the upper-right vertex of the current coding block are first determined. Then, motion information of each motion compensation subunit in the current coding block is derived according to formula (3), where (x, y) represents coordinates, relative to the sample in the upper-left vertex of the current coding block, of a motion compensation subunit, and W and H respectively represents the width and the height of the current coding block.

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (3)$$

The 6-parameter affine transformation model is shown in formula (4):

$$\begin{cases} vx = a_1 + a_3x + a_4y \\ vy = a_2 + a_5x + a_6y \end{cases} \quad (4)$$

The 6-parameter affine transformation model may be represented by using motion vectors of three samples and their coordinates relative to the top-left sample of the current coding block. If samples in the upper-left vertex (0, 0), the upper-right vertex (W, 0), and the lower-left vertex (0, H) are used as control points, motion vectors ($vx_0$, $vy_0$), ($vx_1$, $vy_1$), and ($vx_2$, $vy_2$) of the control points in the upper-left vertex, the upper-right vertex, and the lower-left vertex of the current coding block are first determined. Then, motion information of each motion compensation subunit in the current coding block is derived according to formula (5), where (x, y) represents coordinates, relative to the sample in the upper-left vertex of the current coding block, of a motion compensation subunit, and W represents the width of the current coding block.

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (5)$$

An 8-parameter bilinear model is shown in formula (6):

$$\begin{cases} vx = a_1 + a_3x + a_4y + a_7xy \\ vy = a_2 + a_5x + a_6y + a_8xy \end{cases} \quad (6)$$

The 8-parameter bilinear model may be represented by using motion vectors of four samples and coordinates of the motion vectors relative to a sample of the upper-left vertex of the current coding block. If samples of the upper-left vertex (0, 0), the upper-right vertex (W, 0), the lower-left vertex (0, H), and the lower-right vertex (W, H) are used as control points, motion vectors ($vx_0$, $vy_0$), ($vx_1$, $vy_1$), ($vx_2$, $vy_2$), and ($vx_3$, $vy_3$) of the upper-left vertex, the upper-right vertex, the lower-left vertex, and the lower-right vertex control points of the current coding block are first determined. Then, motion information of each motion compensation subunit in the current coding block is derived according to formula (7), where (x, y) represents coordinates, relative to the sample in the upper-left vertex of the current coding block, of a motion compensation subunit, and W and H are the width and height of the current coding block respectively.

$$\begin{cases} v_x = \frac{v_{1x} - v_{0x}}{W}x + \frac{v_{2x} - v_{0x}}{H}y + \frac{v_{3x} + v_{0x} - v_{1x} - v_{2x}}{WH}y + v_{0x} \\ v_y = \frac{v_{1y} - v_{0y}}{W}x + \frac{v_{2y} - v_{0y}}{H}y + \frac{v_{3y} + v_{0y} - v_{1y} - v_{2y}}{WH}y + v_{0y} \end{cases} \quad (7)$$

A coding block that is predicted according to the non-translational motion model is referred to as a non-translational coding block.

Generally, motion information of a control point of the non-translational coding block may be obtained in an affine transformation-based advanced motion vector prediction (Advanced Motion Vector Prediction, AMVP) mode or an affine transformation-based merge (Merge) mode.

The following describes a method for obtaining motion information of two control points in the 4-parameter affine transformation model.

Affine transformation-based advanced motion vector prediction mode:

(1) Constructing a Candidate Motion Vector 2-Tuple

Figure 5:
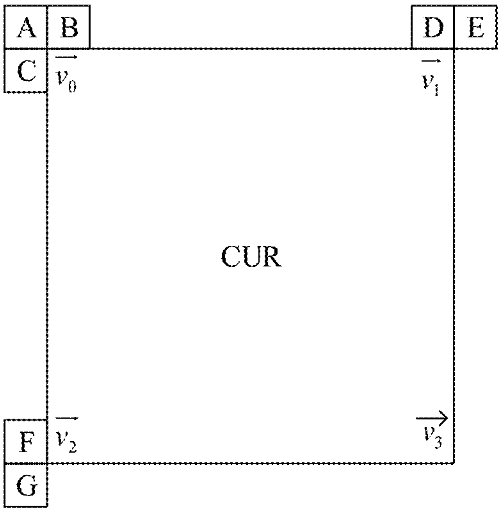
FIG. 5 is a schematic diagram of an advanced motion vector prediction mode of affine transformation.

Motion vectors of the top-left vertex and the top-right vertex of a current coding block are determined based on motion information of a neighboring coded block of the current coding block. As shown in FIG. 5, motion vectors of neighboring coded blocks A, B, and C of the top-left vertex are used as candidate motion vectors of the top-left vertex of the current coding block, and motion vectors of neighboring coded blocks D and E of the top-right vertex are used as candidate motion vectors of the top-right vertex of the current block. The candidate motion vectors of the upper-left vertex and the candidate motion vectors of the upper-right vertex are combined to constitute a candidate motion vector 2-tuple queue of two control points:

$$\{(v_{0A},v_{1D}),(v_{0A},v_{1E}),(v_{0B},v_{1D}),(v_{0B},v_{1E}),(v_{0C},v_{1D}),(v_{0C},v_{1E})\}.$$

$v_0$ represents the candidate motion vector of the top-left vertex, and $v_1$ represents the candidate motion vector of the top-right vertex. Locations of the candidate motion vectors in the queue are indexed, where index values are 0, 1, 2, 3, 4, and 5.

Optionally, the candidate motion vector 2-tuple queue is pruned and sorted according to a particular rule, and truncation and filling may be performed on the candidate motion vector 2-tuple queue to obtain a particular quantity of elements included in the queue.

(2) Determining an Optimal Candidate Motion Vector 2-Tuple

On an encoder side, a motion vector of each motion compensation subunit (which is a sample or a sample block, obtained through splitting by using a method, with a size of N_1×N_2) in the current coding block is obtained by using each candidate motion vector 2-tuple according to formula (3), to obtain a sample value of a location in a reference picture to which a motion vector of each motion compensation subunit points. The sample value is used as a predictor of a sample value of a sample in the current coding block for affine transformation motion compensation. An average value of differences between original values and predictors that are of samples in the current coding block is calculated, and motion vectors in a candidate motion vector 2-tuple corresponding to a minimum difference average are selected as motion vector predictors of the two control points in the current coding block. An index value representing a location of the 2-tuple in the candidate motion vector 2-tuple queue is encoded into a bitstream, and is sent to a decoder.

On a decoder side, the index value is parsed to obtain the motion vector predictors of the two control points.

(3) Determining a Motion Vector of a Control Point

On the encoder side, motion search is performed within a search range by using the motion vector predictors of the two control points as search start points, to obtain the motion vectors of the two control points. Differences between the motion vectors and the motion vector predictors of the two control points are transferred to the decoder side.

On the decoder side, the motion vector differences of the two control points are parsed and added to the motion vector predictors, to obtain the motion vectors of the control points.

Figure 6:
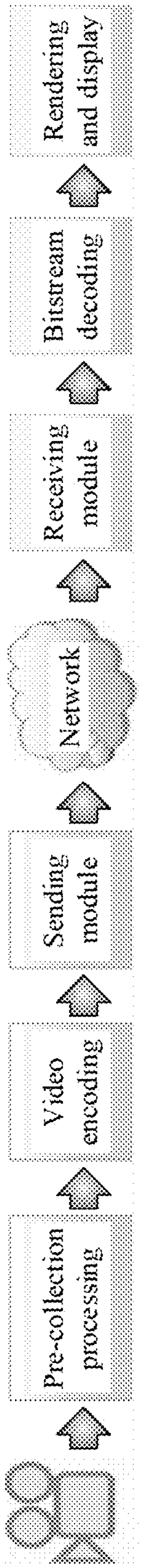
FIG. 6 is a schematic diagram of a video transmission system.

FIG. 6 shows a system framework according to the present disclosure. The present disclosure is mainly related to video encoding and video decoding in the system framework. An existing video transmission system typically includes collection, encoding, sending, receiving, decoding, and display. A collection module includes a camera or a camera module and a pre-processor, and converts an optical signal into a digital video sequence. Then the video sequence is encoded by an encoder and converted into a bitstream. The bitstream is then sent by a sending module to a receiving module through a network, converted by the receiving module, and decoded and reconstructed by a decoder into the video sequence. Finally, the reconstructed video sequence is subject to post processing such as rendering, and sent to a display device for displaying.

The present disclosure is mainly related to video encoding and video decoding in the system framework.

Figure 2:
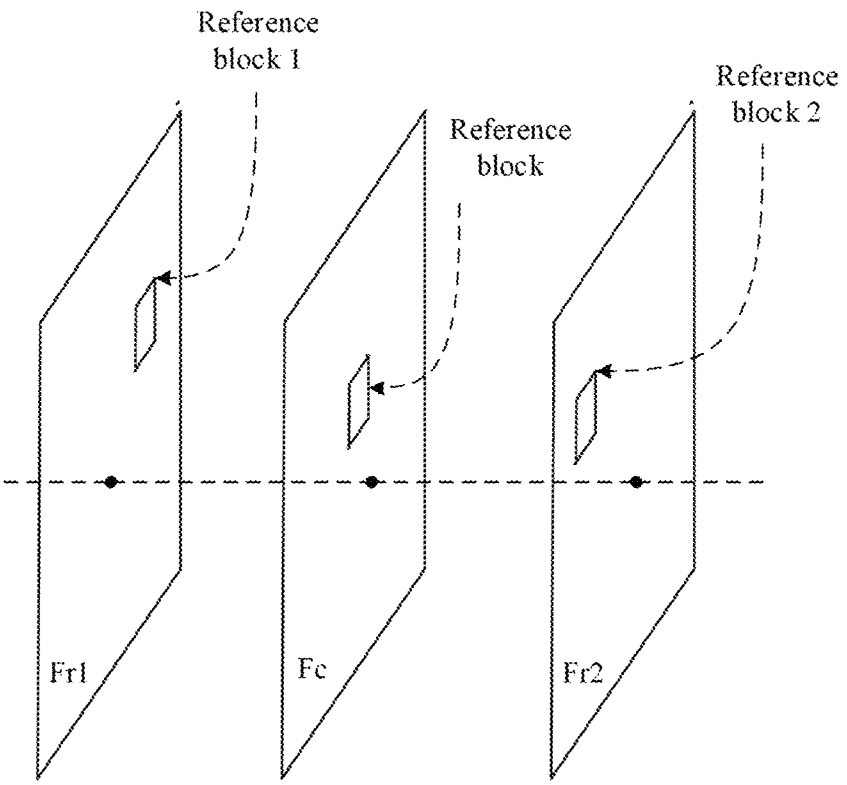
FIG. 2 is a schematic diagram of inter prediction.

An application scenario of the present disclosure is shown in a hybrid coding framework-based video encoding and decoding system shown in FIG. 1 and FIG. 2. An encoding process, as shown in FIG. 1, mainly includes intra prediction, inter-prediction, transform, quantization, entropy encoding, loop filtering, and other stages. These procedures are mainly used to respectively implement the following operations: obtaining a prediction block from a neighboring sample of a current picture, computing MV information and obtaining a prediction block from a reference picture, transforming a residual from a sample domain to a transform domain, compressing a transform-domain coefficient, compressing encoding information, and performing post-processing on a reconstructed picture. Operations in a decoding system, as shown in FIG. 2, are an inverse process performed in the encoding process. The present disclosure is mainly applied to inter prediction in the video encoding and decoding system.

Embodiment 1 (Encoder Side)

Brief descriptions: A list0 and a list are constructed in different motion information list construction modes for a current block. The list0 is a candidate motion vector list used for the current block when the current block is predicted by using a block as a basic prediction unit. The list1 is a candidate motion vector list used for the current block when the current block is predicted by using a subblock as a basic prediction unit. The current block may be split into a plurality of subblocks, and each subblock may be in a square or rectangle shape. The subblock may have, for example but is not limited to a size of 4×4, 8×8, or 4×8. The list0 and the list1 include candidate motion information. The candidate motion information includes a motion vector, a prediction direction, a reference index, and the like. Briefly, the list0 and the list1 are constructed in different motion information list construction modes applicable to features of the current block.

For example, the block-based list0 may include an HEVC mode and a non-adjacent mode; and the subblock-based list1 may include an AFFINE mode (including a motion model-based affine model merge mode and/or a control point-based complex merge mode), an ATMVP mode, an STMVP mode, and a planar mode.

In an implementation process, the block-based list0 may include one or more of candidate motion vector derivation modes such as the HEVC mode and the non-adjacent mode, and the subblock-based list1 may include one or more of candidate motion vector derivation modes such as the AFFINE mode, the ATMVP mode, the STMVP mode, and the planar mode. For example, the list1 may alternatively include only the ATMVP mode. In this application, a plurality of modes may be used for description.

S11: Construct a first candidate motion information list (List0) of the current coding block, that is, construct the block-based candidate motion information list. Motion information in the List0 may be referred to as block-based candidate motion information.

S11.1: Motion information of a spatially and/or temporally neighboring coded block of the current coding block is added into the first candidate motion information list according to a preset rule in the HEVC mode.

Figure 7:
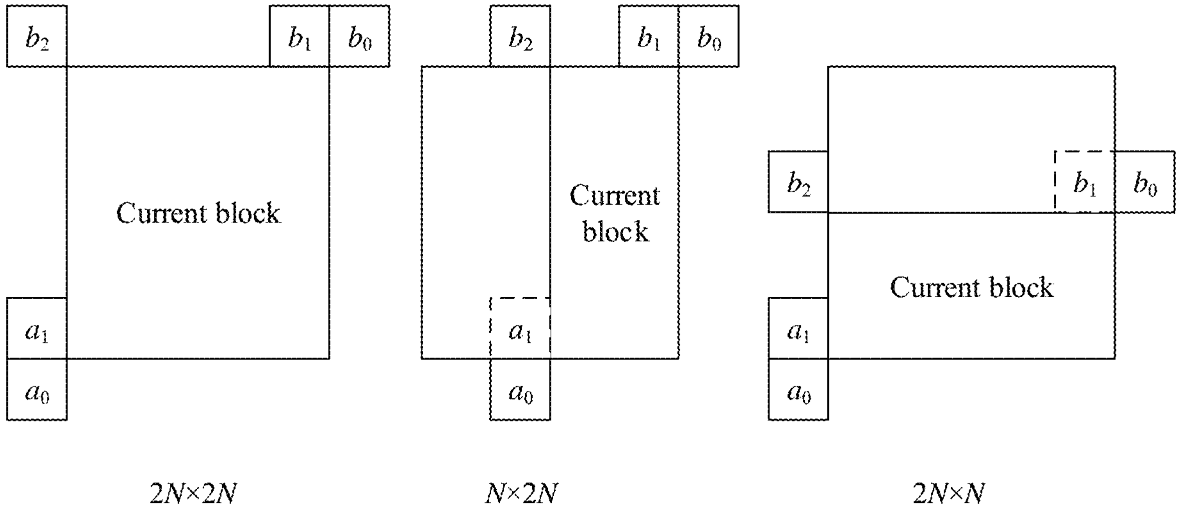
FIG. 7 is a schematic diagram of motion information of spatially neighboring candidate blocks.

FIG. 7 shows motion information of spatially neighboring candidate blocks. In the leftmost, spatial candidate blocks are selected in the following sequence: $a_1$, $b_1$, $b_0$, $a_0$, and ($b_2$). If any of the first four blocks is unavailable, whether motion information of $b_2$ exists and is available is checked. If the motion information of $b_2$ exists and is available, the motion information of $b_2$ is added into the candidate motion information list. Then, temporal candidate motion information and/or a zero vector are/is considered to be added into the motion information list. It should be understood that there may be a plurality of preset rules for selecting a spatial candidate and a temporal candidate. This is not limited in the present disclosure.

In a possible implementation process, a derivation sequence may be $a_0$, $b_0$, $b_1$, $a_1$, and $b_2$. The location $b_2$ is considered only if any CU in the locations $a_0$, $b_0$, $b_1$, and $a_1$ is unavailable (for example, the CU belongs to another slice or another tile) or the CU is intra coded. After the candidate location $a_1$ is added, redundancy check needs to be performed when remaining candidates are added. The redundancy check prevents a candidate item with same motion information from being added into the list, thereby improving coding efficiency. To reduce computation complexity, some candidates may be selectively considered in the redundancy check. For example, a candidate is added into the list only when there is no same motion information for the corresponding candidate used for redundancy check.

In a possible implementation, a maximum quantity of spatial candidate blocks is 4. In addition, if a quantity of pieces (excluding repeated and unqualified information) of candidate motion information in the list0 is equal to MaxNumMergeCand, insertion or addition is stopped. A maximum quantity of pieces MaxNumMergeCand of candidate motion information in a candidates List1 may be transmitted in a bitstream, or a default value may be used in encoding and decoding. In this embodiment, the maximum quantity of pieces of candidate motion information is, for example, 5.

Optionally, the block-based candidate motion information list includes a candidate motion information list that is constructed in a conventional merge mode (which may also be expressed as a general_merge or regular_merge mode in some scenarios) defined according to an HEVC standard or an evolved version of the HEVC standard. All candidate motion information in the block-based candidate motion information list may be motion information of a spatially or temporally neighboring coded block of the current block. Alternatively, some candidate motion information may be motion information of the spatially or temporally neighboring coded block of the current block, and some of the candidate motion information may be motion information obtained in another manner.

S11.2: Add, to the first candidate motion information list according to the preset rule, motion information of a spatially non-neighboring coded block of the current coding block.

Figure 8:
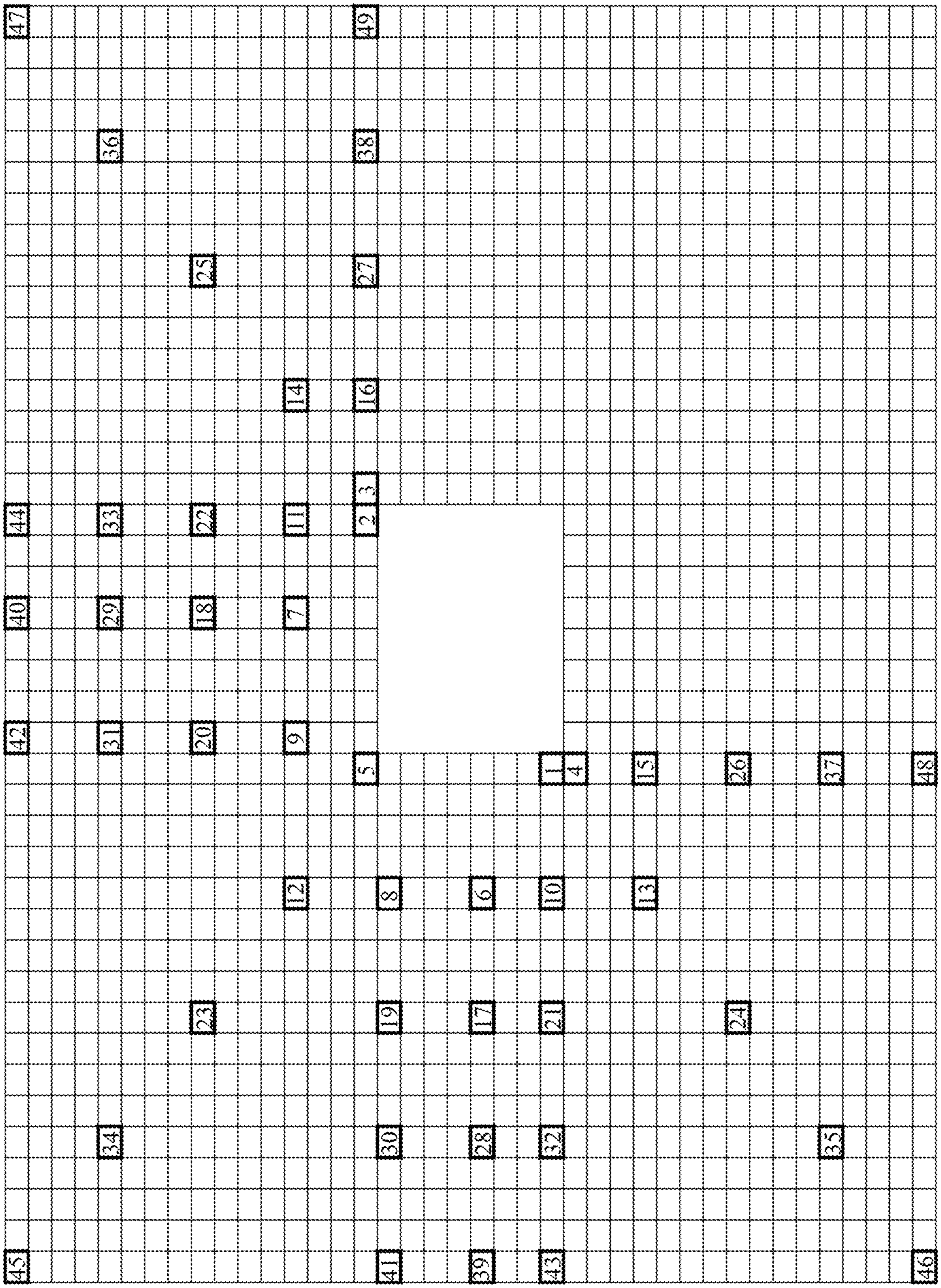
FIG. 8 is a schematic diagram of motion information of spatially non-neighboring candidate blocks.

Motion vectors of spatially non-neighboring candidate blocks are shown in the following figure (FIG. 8). Spatial candidate blocks are selected in the following sequence: a candidate block 6 to a candidate block 49. Motion information corresponding to an available location block is sequentially inserted into the first candidate motion information list after availability is checked and repeated items are removed. If a quantity of pieces (excluding repeated and unqualified information) of candidate motion information in the list0 is equal to MaxNumMergeCand, insertion is stopped.

The list0 is constructed based on S11.1 and S11.2. If the quantity of pieces (excluding repeated and unqualified information) of candidate motion information in the list0 is less than 5, the quantity of pieces of candidate motion information in the list is enabled to reach a specified quantity by adding a zero motion vector. For example, the first candidate motion information list (List0) of the current block may be in the following form.

TABLE 1

| mv-idx (binarization) | Candidate block motion vector |
|---|---|
| 0 (0) | $MV_{a1}$ (equivalent to $MV_1$) |
| 1 (10) | $MV_{B1}$ (equivalent to $MV_2$) |
| 2 (110) | $MV_7$ |
| 3 (1110) | $MV_8$ |
| 4 (1111) | $MV_{12}$ |

Alternatively, the first candidate motion information list (List0) of the current block may be in the following form.

TABLE 2

| mv-idx | Candidate block motion vector |
|---|---|
| 0 | $MV_{a1}$ (equivalent to $MV_1$) |
| 1 | $MV_{B1}$ (equivalent to $MV_2$) |
| 2 | $MV_7$ |

TABLE 2-continued

| mv-idx | Candidate block motion vector |
|---|---|
| 3 | $MV_8$ |
| 4 | 0 |

It should be noted that, in the present disclosure, in S11 of constructing the block-based candidate motion information list, a sequence of adding the candidate motion information into the list in S11.1 and adding the candidate motion information into the list in S11.2 is not limited. The motion information in S11.1 may be first added, and the motion information in S11.2 is then added; the motion information in S11.2 may be first added, and the motion information in S11.1 is then added; or the motion information in S11.1 and S11.2 may be alternately added into the list. Alternatively, either or both of S11.1 and S11.2 may be performed for S11.

S12: Construct a second candidate motion information list (List1) of a current encoding subblock, that is, construct the subblock-based candidate motion information list. Motion information in the list1 may be referred to as subblock-based candidate motion information.

S12.1: Motion information of a spatially neighboring coded block of the current coding block is added into the second candidate motion information list (List1) according to a preset rule in a motion model-based affine model merge (AMM) mode.

To improve coding efficiency when the current block is an affine transformation prediction block, when motion information of a control point of the current block is encoded, one block is selected from neighboring blocks of the current block according to a preset selection policy, and motion information of a vertex of the current block is derived based on motion information of a vertex of the block (This may be referred to as luma affine control point motion vectors from a neighbouring block in the standard). The encoder side does not need to transfer indication information of the selected neighboring block to a decoder side. In this case, the current block and the neighboring block use a same affine transformation model.

Figure 9:
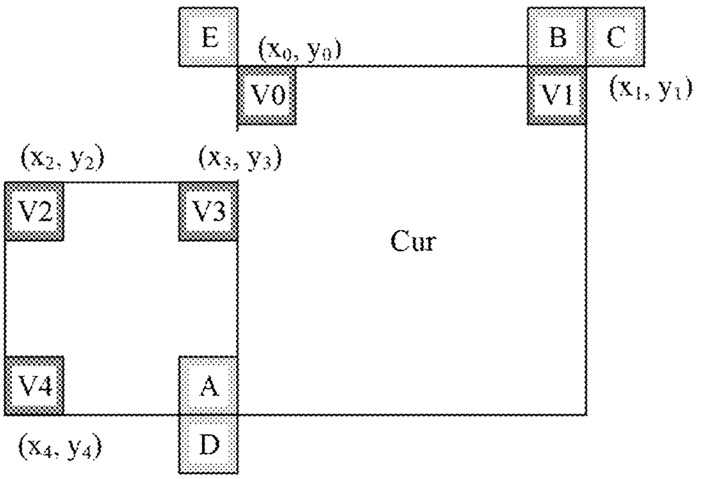
FIG. 9 is a schematic diagram of an affine model merge mode.

As shown in FIG. 9, A, B, C, D, and E are neighboring coded blocks of the current coding block, and traversing is performed in a sequence of A, B, C, D, and E to find an affine coded block, motion information of a control point of the affine coded block is obtained, and motion information of the upper-left vertex and the upper-right vertex of the current coding block is further derived.

The following uses A as an example to describe a derivation process, and other cases are similar. If a coded block corresponding to A is an affine coded block, a motion vector ($vx_2$, $vy_2$) of the upper-left vertex ($x_2$, $y_2$) and a motion vector ($vx_3$, $vy_3$) of the upper-right vertex ($x_3$, $y_3$) of the affine coded block are obtained. A motion vector ($vx_0$, $vy_0$) of the upper-left vertex ($x_0$, $y_0$) of the current coding block is calculated according to formula (8). A motion vector ($vx_1$, $vy_1$) of the upper-right vertex ($x_1$, $y_1$) of the current coding block is calculated according to formula (9).

$$\begin{cases} vx_0 = vx_2 + \frac{(vx_3 - vx_2)}{x_3 - x_2} \times (x_0 - x_2) - \frac{(vy_3 - vy_2)}{(x_3 - x_2)} \times (y_0 - y_2) \\ vy_0 = vx_2 + \frac{(vy_3 - vy_2)}{x_3 - x_2} \times (x_0 - x_2) + \frac{(vx_3 - vx_2)}{x_3 - x_2} \times (y_0 - y_2) \end{cases} \tag{8}$$

-continued $$\begin{cases} vx_1 = vx_2 + \frac{(vx_3 - vx_2)}{x_3 - x_2} \times (x_1 - x_2) - \frac{(vy_3 - vy_2)}{(x_3 - x_2)} \times (y_1 - y_2) \\ vy_1 = vx_2 + \frac{(vy_3 - vy_2)}{x_3 - x_2} \times (x_1 - x_2) + \frac{(vx_3 - vx_2)}{x_3 - x_2} \times (y_1 - y_2) \end{cases} \tag{9}$$

Motion information corresponding to an available location block is sequentially inserted into the second candidate motion information list (List1) after availability is checked and repeated items are removed. If a quantity of pieces (excluding repeated and unqualified information) of candidate motion information in the list1 is equal to MaxNumMergeCand, insertion is stopped.

S12.2: Add, into the second candidate motion information list (List1) according to a preset rule in a control point-based complex merge mode (complex merge mode), motion information of a spatially neighboring coded block of the current coding block.

Figure 10:
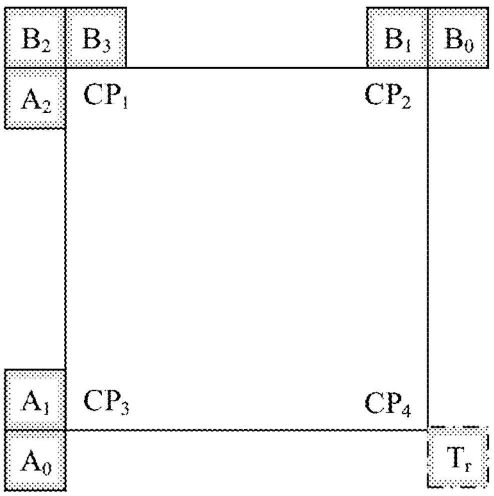
FIG. 10 is a schematic diagram of a complex merge mode.

First, motion information of each control point is derived. As shown in FIG. 10, a $CP_k$ (k=1, 2, 3, 4) represents a $k^{th}$ control point. $A_0$, $A_1$, $A_2$, $B_0$, $B_1$, $B_2$, and $B_3$ represent spatially neighboring locations of the current block, and are used for predicting the $CP_k$ (k=1, 2, 3). $T_r$ represents a temporally neighboring location of the current block, and is used for predicting the $CP_4$.

Coordinates of $CP_1$, $CP_2$, $CP_3$, and $CP_4$ are (0, 0), (W, 0), (H, 0), and (W, H), respectively, where W and H represent the width and the height of the current block.

For each control point, motion information of the control points is obtained in the following sequence:

For the $CP_1$, a check sequence is $B_2$->$A_2$->$B_3$. If $B_2$ is available, motion information of $B_2$ is used. Otherwise, $A_2$ and $B_3$ are checked. If motion information of all the three locations is unavailable, motion information of the $CP_1$ cannot be obtained.

For the $CP_2$, a checking sequence is $B_0$->$B_1$.

For the $CP_3$, a checking sequence is $A_0$->$A_1$.

For the $CP_4$, motion information of $T_r$ is used.

Herein, "available" herein means that a block in a location X is encoded and is inter encoded. Otherwise, the location X is unavailable.

It should be noted that other methods for obtaining motion information of a control point are also applicable to the present disclosure. Details are not described herein.

Then, the motion information of the control points is combined to obtain non-translational (affine model-based) motion information.

Motion information of two control points is combined to construct a 4-parameter affine transformation model. Two of the control points are combined as follows: {$CP_1$, $CP_4$}, {$CP_2$, $CP_3$}, {$CP_1$, $CP_2$}, {$CP_2$, $CP_4$}, {$CP_1$, $CP_3$}, and {$CP_3$, $CP_4$}. For example, a 4-parameter affine transformation model constructed with the control points $CP_1$ and $CP_2$ is denoted as affine ($CP_1$, $CP_2$).

Motion information of three control points is combined to construct a 6-parameter affine transformation model. Three of the control points are combined as follows: {$CP_1$, $CP_2$, $CP_4$}, {$CP_1$, $CP_2$, $CP_3$}, {$CP_2$, $CP_3$, $CP_4$}, and {$CP_1$, $CP_3$, $CP_4$}. For example, a 6-parameter affine transformation model constructed with the control points $CP_1$, $CP_2$, and $CP_3$ is denoted as affine ($CP_1$, $CP_2$, $CP_3$).

Motion information of four control points is combined to construct an 8-parameter bilinear model. An 8-parameter bilinear model constructed with the control points $CP_1$, $CP_2$, $CP_3$, and $CP_4$ is denoted as bilinear ($CP_1$, $CP_2$, $CP_3$, $CP_4$).

These models (different types of models or a same type of models) are traversed in a pre-configured sequence. If motion information of a control point corresponding to a combination model is unavailable, the model is considered to be unavailable. Otherwise, a reference index (motion vectors of all control points point to a same reference picture) of the model is determined, and a motion vector of the control point is scaled. For example, the motion vector is scaled according to formula (10). A scaling coefficient is a ratio of a distance from a current picture to a reference picture versus a distance from the current picture to a reference picture of a neighboring block. If motion information of all the control points is consistent after scaling, the model is invalid. Otherwise, motion information of the control points constructing the model is added into the candidate motion information list.

$$MV_s = \frac{CurPoc - DesPoc}{CurPoc - SrcPoc} \times MV \tag{10}$$

Motion information corresponding to an available location block is sequentially inserted into the second candidate motion information list (List1) after availability is checked and repeated items are removed. If a quantity of pieces (excluding repeated and unqualified information) of candidate motion information in the list1 is equal to MaxNumMergeCand, insertion is stopped.

Candidate motion information obtained in the complex merge mode is referred to as constructed affine control point motion vector merging candidates in a latest standard.

S12.3: Add an ATMVP and/or STMVP candidate motion vector into the second candidate motion information list (List1) according to a preset rule.

By using a subblock-based motion vector prediction (SubBLOCK-based motion vector prediction, SMVP) technology, a current coding unit is split into coding subunits each with a size of M×N, motion information of each coding subunit is derived, and then motion compensation is performed based on motion information of all the coding subunits, to obtain a predictor of the current coding unit.

In the technology, there are two types of candidate motion information in the merge mode: advanced temporal motion vector prediction (ATMVP) candidate motion information and spatial-temporal motion vector prediction (STMVP) candidate motion information.

Figure 11:
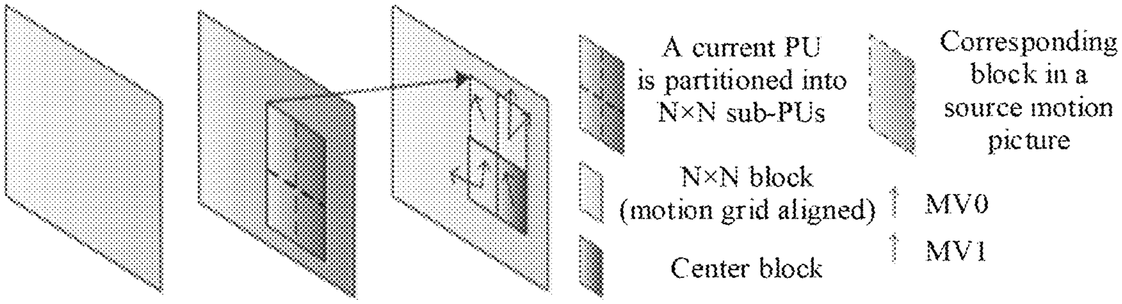
FIG. 11 is a schematic diagram of an ATMVP prediction mode.

In the ATMVP technology, a collocated reference picture is first determined, a current coding unit (the current block) is split into coding subunits (coding subblocks) each with a size of M×N, motion information of a center point location sample of a coding subunit that corresponds to each current coding subunit and that is in the collocated reference picture is obtained, the motion information is scaled, and the motion information is converted into motion information of each current coding subunit, as shown in FIG. 11.

Figure 12:
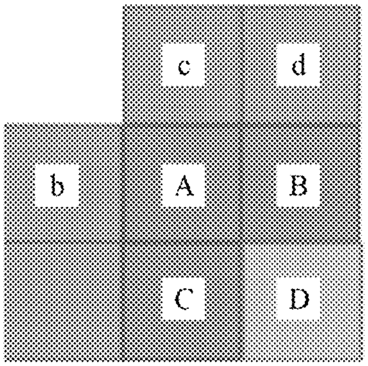
FIG. 12 is a schematic diagram of an STMVP prediction mode.

In the STMVP technology, motion information of each current encoding subunit at an upper spatially neighboring location, a left spatially neighboring location, and a lower-right temporally neighboring location is obtained; an average value of the motion information is calculated; and the calculated average value is converted into motion information of each current encoding subunit. As shown in the following figure (FIG. 12), the current coding unit is split into four encoding subunits: A, B, C, and D. A is used as an example. Motion information of the encoding subunit A is derived based on motion information of spatially neighboring locations c and b and motion information of the location D in the collocated reference picture.

Motion information corresponding to an available location block is sequentially inserted into the second candidate motion information list (List1) after availability is checked and repeated items are removed. If a quantity of pieces (excluding repeated and unqualified information) of candidate motion information in the list1 is equal to MaxNumMergeCand, insertion is stopped.

S12.4: Add planar candidate motion information into the second candidate motion information list (List1) according to a preset rule.

Figure 13:
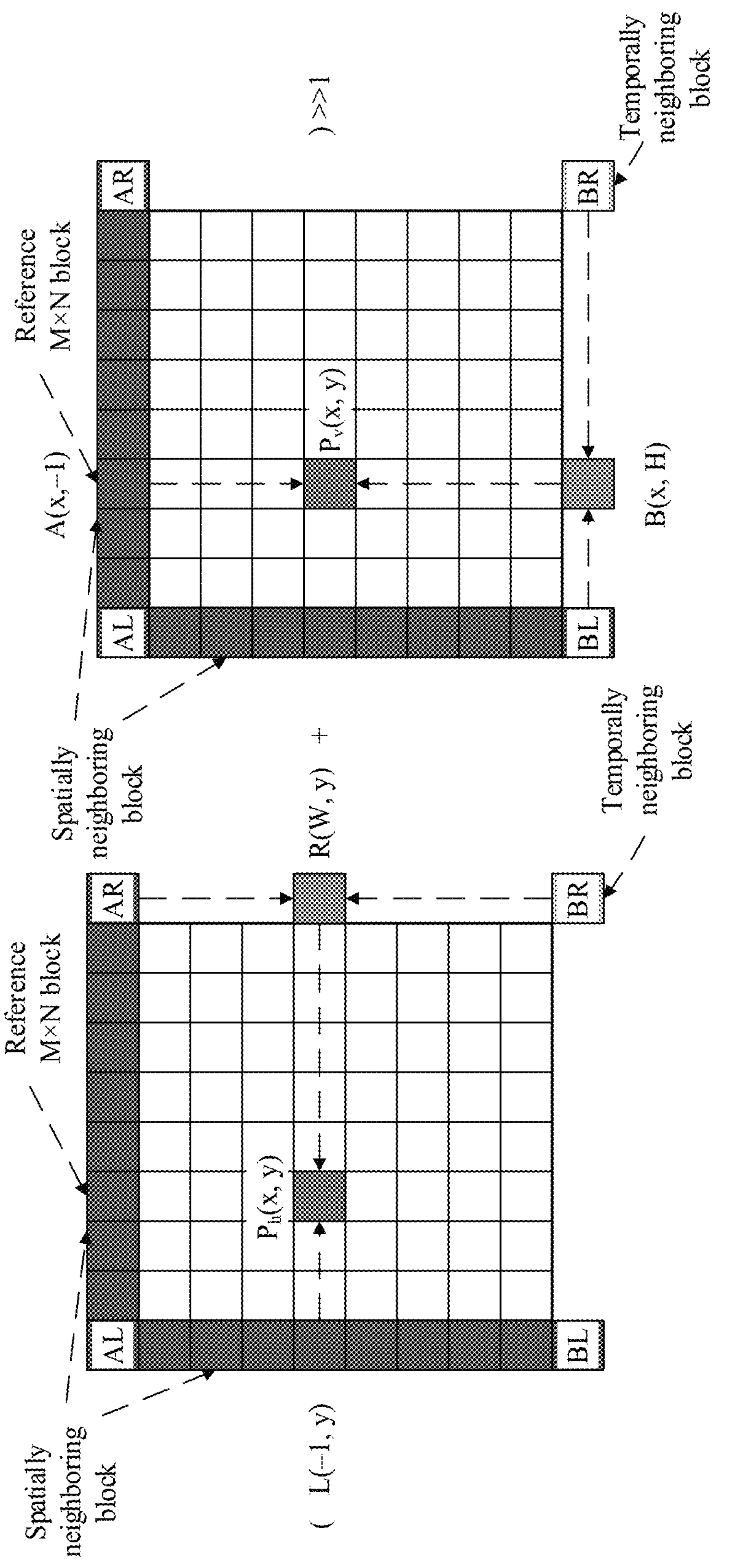
FIG. 13 is a schematic diagram of planar motion vector derivation.

Refer to FIG. 13. Motion information of a lower-right temporally neighboring M×N block of the current block is obtained. Motion information of each right neighboring M×N block R (W, y) is obtained through vertical interpolation according to the following formula based on motion information of an upper-right spatially neighboring block (AR) and the motion information of the lower-right temporally neighboring M×N block (BR), where M×N represents a size of a block:

$$R(W, y) = ((H - y - 1) \times AR + (y + 1) \times BR)/H.$$

Motion information of each lower neighboring M×N block (B (x, H)) is obtained through horizontal interpolation according to the following formula based on motion information of a lower-left spatially neighboring M×N block (BL) and the motion information of the lower-right temporally neighboring M×N block (BR):

$$B(x, H) = ((W - x - 1) \times BL + (x + 1) \times BR)/W.$$

(x, y) represents coordinates of a current M×N subblock relative to an upper-left subblock of the current block. W and H respectively represent the width and the height (measured in subblocks) of the current block. AR represents the motion information of the upper-right spatially neighboring M×N block. BR represents the motion information of the lower-right temporally neighboring M×N block. BL represents the motion information of the lower-left spatially neighboring M×N block.

Motion information of each subblock is obtained in the following manner.

A horizontal motion vector is obtained through horizontal interpolation according to the following formula based on a motion vector of a left neighboring M×N block and a motion vector of a right neighboring M×N block in a row in which the current subblock is located:

$$P_h(x, y) = (W - 1 - x) \times L(-1, y) + (x + 1) \times R(W, y).$$

A vertical motion vector is obtained through vertical interpolation according to the following formula based on a motion vector of an upper neighboring M×N block and a motion vector of a lower neighboring M×N block in a column in which the current subblock is located:

$$P_v(x, y) = (H - 1 - y) \times A(x, -1) + (y + 1) \times B(x, H).$$

A mean value of the motion vectors obtained through horizontal and vertical linear interpolation is obtained according to the following formula, that is, a motion vector of each subblock is:

$$P(x, y) = (H \times P_n(x, y) + W \times P_v(x, y) + H \times W) / (2 \times H \times W).$$

L(−1, y) and R(W, y) respectively represent the motion vector of the left neighboring M×N block and the motion vector of the right neighboring M×N block in the row in which the current subblock is located. A(x,−1) and B(x, H) respectively represent the motion vector of the upper neighboring M×N block and the motion vector of the lower neighboring M×N block in the column in which the current subblock is located. $P_h(x, y)$ represents the motion vector obtained through horizontal interpolation. $P_v(x, y)$ represents the motion vector obtained through vertical interpolation.

If all spatial and temporal neighboring blocks (and temporally neighboring blocks) contain same motion information (only existing and processed motion information) in a list, the list is unavailable. If two lists are unavailable, planar motion information is unavailable. Alternatively, if all spatially neighboring blocks (and temporally neighboring blocks) contain same motion information (only existing and processed motion information) in a list, the same motion information is motion information of all subblocks of the current coding block in the list.

Motion information corresponding to an available location block is sequentially inserted into the second candidate motion information list (List1) after availability is checked and repeated items are removed. If a quantity of pieces (excluding repeated and unqualified information) of candidate motion information in the list1 is equal to MaxNumMergeCand, insertion is stopped.

The list1 is constructed based on S12.1 to S12.4. If the quantity of pieces (excluding repeated and unqualified information) of candidate motion information in the list1 is less than 5, the quantity of pieces of candidate motion information in the list is enabled to reach a specified quantity by adding a zero motion vector. For example, the second candidate motion information list (List1) of the current block may be in a form shown in Table 3:

TABLE 3

| mv-idx | Candidate block motion vector |
|---|---|
| 0 | $MV_{AMM-A}$ |
| 1 | $MV_{CP-B}$ |
| 2 | $MV_{ATMVP-A}$ |
| 3 | $MV_{STMVP-b}$ |
| 4 | $MV_{PLANAR}$ |

Alternatively, the second candidate motion information list (List1) of the current block may be in a form shown in Table 4:

TABLE 4

| mv-idx | Candidate block motion vector |
|---|---|
| 0 | $MV_{AMM-A}$ |
| 1 | $MV_{CP-B}$ |
| 2 | $MV_{ATMVP-A}$ |
| 3 | $MV_{PLANAR}$ |
| 4 | 0 |

It should be noted that, in the present disclosure, in S12 of constructing the subblock-based candidate motion information list, a sequence of adding the candidate motion information in S12.1, S12.2, S12.3, or S12.4 into the list is not limited. The candidate motion information may be added in sequence; or different types of motion information may be alternately added into the list; or one or more of the candidate motion information in S12.1, S12.2, S12.3, and S12.4 may be added into the list.

It should be understood that the subblock-based candidate motion information list is a candidate motion information list constructed in a subblock-based merge mode (merge_subblock) mode, and the subblock-based candidate motion information list may include a candidate motion information list constructed in at least one subblock-based merge mode of affine model merge, complex merge, or ATMVP. All candidate motion information in the subblock-based candidate motion information list may be obtained through derivation in the affine model merge mode, or in the complex merge mode, or only in the ATMVP mode, or in a plurality of different modes. The plurality of different modes may be any combinations of the three modes of affine model merge, complex merge, and ATMVP. In some possible cases, the candidate motion information list may further include motion information obtained in another subblock-based mode. The candidate motion information may be added into the list as follows: candidate motion information derived in the ATMVP mode may be first added, and then candidate motion information derived in another mode may be added. The combination manner and the adding sequence, are not enumerated or described in detail in the present disclosure.

Optionally, a block including 2×2 subblocks is used as an example. A possible implementation form of the subblock-based constructed candidate motion information list list1 may include: {ATMVP (($MV_{x01}$, $MV_{y01}$) ($MV_{x02}$, $MV_{y02}$) ($MV_{x03}$, $MV_{y03}$) ($MV_{x04}$, $MV_{y04}$)), ($MV_{x1}$, $MV_{y1}$), ($MV_{x2}$, $MV_{y2}$), ($MV_{x3}$, $MV_{y3}$), ($MV_{x4}$, $MV_{y4}$)}. If a value of an index is 0, corresponding prediction may be respectively performed on the four subblocks based on ($MV_{x01}$, $MV_{y01}$) ($MV_{x02}$, $MV_{y02}$) ($MV_{x03}$, $MV_{y03}$) ($MV_{x04}$, $MV_{y04}$) subsequently. If a value of an index is 1, each MV of a subblock of the current block is derived based on ($MV_{x1}$, $MV_{y1}$) in the AFFINE mode. Then, each subblock of the current block is predicted based on each derived MV.

Optionally, a possible implementation form of the subblock-based constructed candidate motion information list list1 may include: {ATMVP ($MV_{x1}$, $MV_{y1}$), ($MV_{x2}$, $MV_{y2}$), ($MV_{x3}$, $MV_{y3}$), ($MV_{x4}$, $MV_{y4}$)}. If a value of an index is 0, motion information that is last used is obtained through ATMVP. If a value of an index is 1, used motion information is an MV, derived based on ($MV_{x1}$, $MV_{y1}$) in the AFFINE mode, of a subblock of the current block.

S13: Select optimal candidate motion information from the two lists.

The optimal candidate motion information is determined from the two candidate motion information lists according to a minimum rate-distortion cost criterion, and the optimal candidate motion information is used as the motion information of the current coding block. Then, an index (for example, list-idx) of a candidate motion information list including the optimal candidate motion information and an index value (for example, mv-idx) of a location of the optimal candidate motion information in the list are transferred to the decoder side. A rate-distortion cost is calculated according to the following formula, where J represents a rate-distortion cost RD Cost, SAD represents a sum of absolute differences (SAD) between an original sample value and a predicted sample value that is obtained through motion compensation performed by using candidate motion information, R represents a bit rate, and λ represents a Lagrange multiplier. The encoder side transmits an index value of selected motion information in the candidate motion information list to the decoder side.

$$J = SAD + \lambda R.$$

S14: Perform motion compensation on the current block based on the optimal candidate motion information obtained in S13, to obtain a sample predictor of the block.

In addition, it should be understood that “0” and “1” in the list0 and the list1 are merely used for differentiation. Whether the list0 or the list1 is named as a block-based list or a subblock-based list may be determined according to a preset rule. This is not limited in this application.

If optimal motion information is motion information in the block-based candidate motion information list, the current block is predicted based on the optimal motion information.

If optimal motion information is motion information in the subblock-based candidate motion information list, at least the following two cases are included.

Case 1: If the optimal motion information is obtained in an affine mode (including at least the affine model merge mode or the complex merge mode), motion information corresponding to a subblock of the current block is derived based on the optimal motion information, and the subblock of the current block is predicted. The current block may include a plurality of subblocks, and the subblock of the current block may be any one of the plurality of subblocks.

In a possible implementation process, motion information corresponding to each subblock of the current block is derived based on the optimal motion information, and each subblock of the current block is correspondingly predicted.

Case 2: If the optimal motion information is derived through ATMVP, a subblock of the current block is predicted based on the optimal motion information.

In a possible implementation process, the optimal candidate motion information may be a combination of motion information and includes motion information corresponding to each subblock of the current block, and each subblock of the current block is correspondingly predicted.

In addition, it should be further understood that performing prediction based on the optimal motion information may include directly performing prediction based on the optimal motion information; or may include deriving the optimal motion information, and predicting the optimal motion information based on motion information derived; or may include correcting the optimal motion information, and performing prediction based on motion information obtained through correction.

The foregoing cases are merely some possible implementations of the present disclosure, and shall not constitute any limitation. Other cases are not exhaustively described in the present disclosure.

Optionally, the width of the current block is greater than or equal to a threshold, and/or the height of the current block is greater than or equal to a threshold. The threshold may be 4, 8, or 16, but this is not limited.

According to Embodiment 1, the following method flow may be obtained.

S1301: Construct a first list, where the first list is a block-based candidate motion information list.

S1302: Construct a second list, where the second list is a subblock-based candidate motion information list.

S1303: Determine optimal candidate motion information from the first candidate motion information list and the second candidate motion information list.

S1304: Predict a current block based on the optimal motion information.

The method may also further include the following steps.

S1305: Obtain an identifier that is used to determine a candidate motion information list including optimal candidate motion information of a current block, and obtain an index of the optimal candidate motion information in the candidate motion information list, where an inter prediction mode used for the current block is a merge mode, and when the identifier is a first feature value, the candidate motion information list is the first list, or when the identifier is a second feature value, the candidate motion information list is the second list.

S1306: Encode the identifier and the index into a bitstream.

S1305 and S1306 may further independently constitute a new encoding method. Details are not described herein.

Differences between Embodiment 1 and a current technology are as follows: A plurality of types of candidate motion information are inserted into different candidate motion information lists, the optimal candidate motion information is selected according to the RDO criterion, and the optimal candidate motion information is transferred to the decoder side. According to Embodiment 1, the block-based candidate motion information list and the subblock-based candidate motion information list may be distinguished from each other, so that the block-based candidate motion information list and the subblock-based candidate motion information list are obtained. This effectively reduces transmission costs of the optimal candidate motion information.

Embodiment 2 (Decoder Side)

Brief descriptions: Candidate motion information of a current block and candidate motion information of a current subblock may be respectively inserted (or constructed) into a list0 and a list1 in obtaining modes of the candidate motion information.

The block-based list0 includes an HEVC mode and a non-adjacent mode.

The subblock-based list1 includes an AFFINE mode (including a motion model-based affine model merge mode or a control point-based complex merge mode), an ATMVP mode, an STMVP mode, and a planar mode.

In an implementation process, the block-based list0 may include one or more of candidate motion vector derivation modes such as the HEVC mode (general_merge or regular_merge) and the non-adjacent mode, and the subblock-based list1 may include one or more of candidate motion vector derivation modes such as the AFFINE mode, the ATMVP mode, the STMVP mode, and the planar mode. In this application, a plurality of modes may be used for description. For example, the list1 may alternatively include only the ATMVP mode.

S21: Parse a bitstream to obtain index information of optimal candidate motion information.

In examples, the bitstream is parsed to obtain an index (for example, list-idx) of a candidate motion information list including the optimal candidate motion information and an index value (for example, mv-index) of a location of the optimal candidate motion information in the list. It should be understood that more syntax elements may be further obtained by parsing the bitstream, and the list index is merely a possible implementation.

S22: Construct a candidate motion information list based on an index of the candidate motion information list.

For example but not limited to, there may be the following cases.

If list-idx=0, implementation may be performed by using a method that is the same as or similar to the method in S11. For example, a block-based candidate motion information list is constructed in the mode in S11.1 and/or S11.2. For example, the candidate motion information list may be but is not limited to the list shown in Table 1 or Table 2.

If list-idx=1, implementation may be performed by using a method that is the same as or similar to the method in S12. For example, a subblock-based candidate motion information list is constructed in the mode in S12.1, S12.2, and/or S12.3. For example, the candidate motion information list may be but is not limited to the list shown in Table 3 or Table 4.

It can be learned from the tables that a motion vector can be determined provided that an index (list-idx) of a motion vector list and an index (mv-index) of a vector in the list are determined. Optionally, an identifier of the index may be represented as, for example, list-idx. However, this is not limited. Optionally, a value of the identifier of the index list-idx may include but not limited to 0 or 1. Optionally, the candidate motion information list constructed in a block-based mode may be represented as the list0 (or list1), and the candidate motion information list constructed in a subblock-based mode may be represented as the list1 (or list0). The "block-based mode" refers to a mode of performing prediction based on the current block, and the "subblock-based mode" refers to a mode of performing prediction based on a subblock, where the subblock is obtained by splitting the current block into a plurality of subblocks.

It should be understood that specific values of feature values, or forms of identifiers, or specific representation symbols of lists are not limited and not exhaustively described in the present disclosure.

It should be understood that a list index, or a similar identifier, or a similar syntax element may be used to determine the candidate motion information list that includes the optimal candidate motion information of the current block, or may be used to determine a mode of constructing the candidate motion information list that includes the optimal candidate motion information of the current block; or may be used to indicate whether a conventional merge mode or a subblock-based merge mode is used for the current block.

Optionally, when the bitstream is parsed, the obtained syntax element may include a list index, and the determining, based on the syntax element, to construct a first list or a second list for the current coding block includes: obtaining a candidate motion information list index, where when the list index is a first feature value, it indicates to construct the first list for the current coding block, or when the list index is a second feature value, it indicates to construct the second list for the current coding block.

Optionally, when the bitstream is parsed, the obtained syntax element may include indication information used to indicate a conventional merge mode used for the current block or indication information used to indicate a subblock-based merge mode used for the current block.

Optionally, when the bitstream is parsed, the obtained syntax element may include indication information used to determine that the block-based candidate motion information list is used for the current block or indication information used to determine that the subblock-based candidate motion information list is used for the current block.

S23: Determine the optimal candidate motion information based on the index information.

In examples, the optimal candidate motion information is determined from the list based on list-idx and mv-index.

For example, if list-idx=0 and mv-index=0, motion information of the current block is MVB1.

S24: Perform motion compensation on the current block based on the optimal candidate motion information obtained in S23, to obtain a sample predictor of the block.

A specific prediction mode may correspond to a prediction mode on an encoder side.

If optimal motion information is motion information in the block-based candidate motion information list, the current block is predicted based on the optimal motion information.

If optimal motion information is motion information in the subblock-based candidate motion information list, at least the following two cases are included.

Case 1: If the optimal motion information determined in S23 is obtained in an affine mode (including at least the affine model merge mode or the complex merge mode), motion information corresponding to a subblock of the current block is derived based on the optimal motion information, and the subblock of the current block is predicted. The current block may include a plurality of subblocks, and the subblock of the current block may be any one of the plurality of subblocks.

In a possible implementation process, motion information corresponding to each subblock of the current block is derived based on the optimal motion information, and each subblock of the current block is correspondingly predicted.

Case 2: If the optimal motion information determined in S23 is obtained in the ATMVP mode, the subblock of the current block is predicted based on the optimal motion information.

In a possible implementation process, the optimal candidate motion information may be a combination of motion information and includes motion information corresponding to each subblock of the current block, and each subblock of the current block is correspondingly predicted.

Case 3: If the optimal motion information determined in S23 is obtained in the ATMVP mode through an indication, the optimal motion information is obtained based on the corresponding indication, and a subblock of the current block is predicted based on the optimal motion information.

In a possible implementation process, the optimal candidate motion information may be obtained based on indication information. Motion information corresponding to each subblock of the current block may be obtained in the ATMVP mode based on the indication information, and each subblock of the current block is correspondingly predicted.

In addition, it should be further understood that performing prediction based on the optimal motion information may include directly performing prediction based on the optimal motion information; or may include deriving the optimal motion information, and performing prediction based on motion information obtained through derivation; or may include correcting the optimal motion information, and performing prediction based on motion information obtained through correction.

The foregoing cases are merely some possible implementations of the present disclosure, and shall not constitute any limitation. Other cases are not exhaustively described in the present disclosure.

Optionally, the width of the current block is greater than or equal to a threshold, and/or the height of the current block is greater than or equal to a threshold. The threshold may be 4, 8, or 16, but this is not limited.

Figure 14:
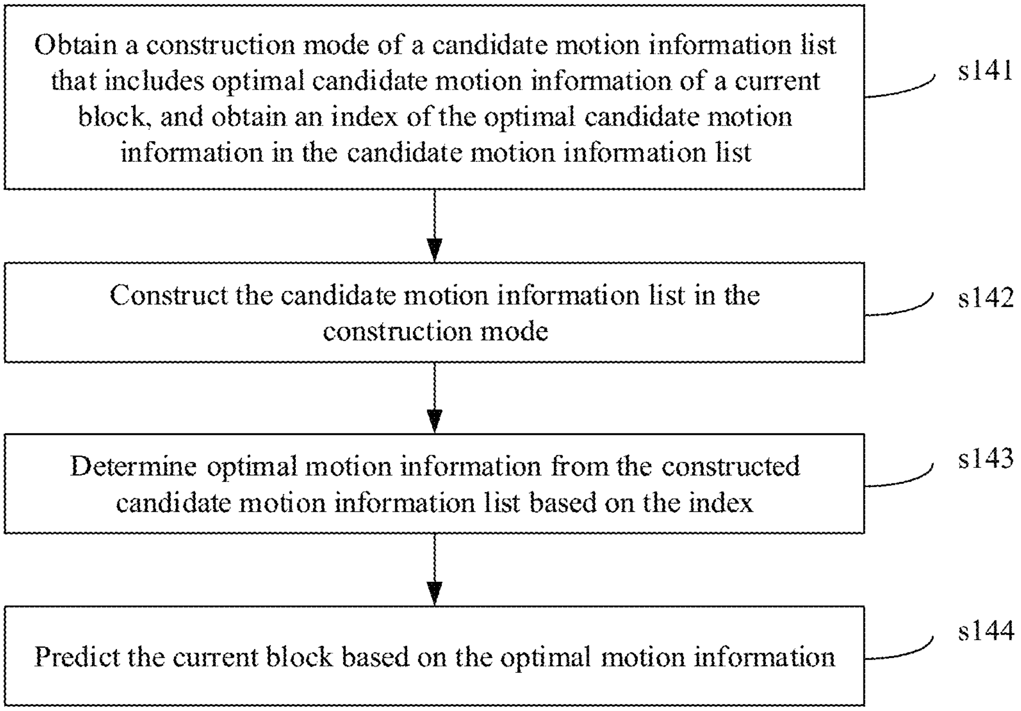
FIG. 14 shows a decoding method according to an embodiment of the present invention.
Figure 15:
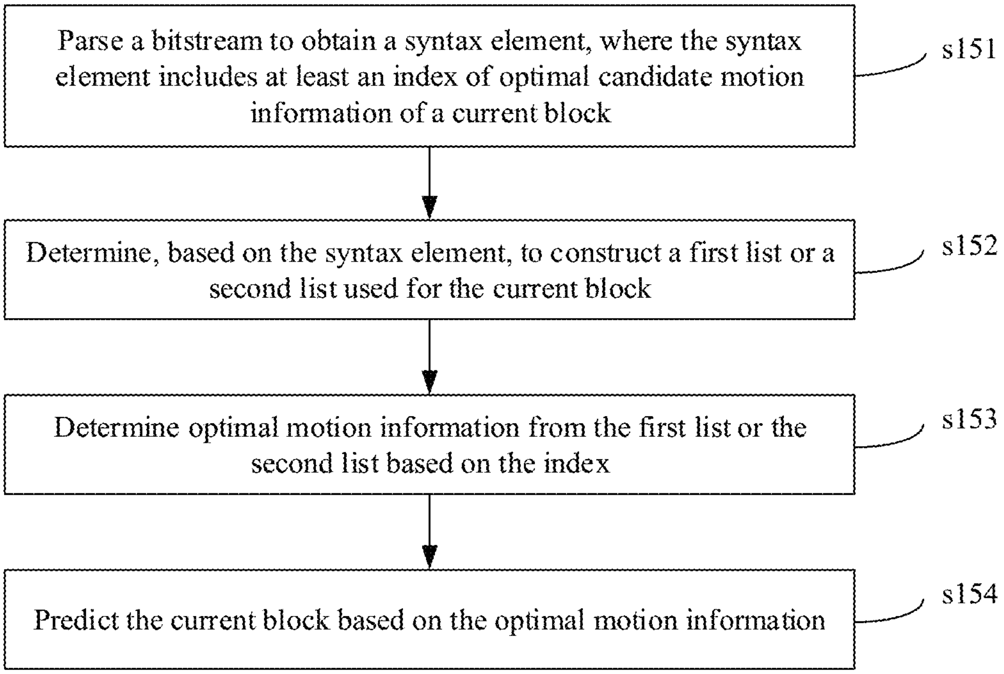
FIG. 15 shows another decoding method according to an embodiment of the present invention.

In conclusion, according to Embodiment 1 and Embodiment 2, the following method procedures may be obtained in the present disclosure. Refer to FIG. 14 and FIG. 15.

FIG. 14 shows a decoding method. The method includes the following steps.

S141: Obtain a construction mode of a candidate motion information list that includes optimal candidate motion information of a current block, and obtain an index of the optimal candidate motion information in the candidate motion information list, where the construction mode of the candidate motion information list is a mode of constructing a block-based candidate motion information list or a mode of constructing a subblock-based candidate motion information list.

For an optional manner, refer to S21 in the embodiment.

In examples, an identifier that is used to determine the candidate motion information list is obtained. An inter prediction mode used for the current block is a merge mode. When the identifier is a first feature value, the construction mode of the candidate motion information list is the mode of constructing the block-based candidate motion information list; or when the identifier is a second feature value, the construction mode of the candidate motion information list is the mode of constructing the subblock-based candidate motion information list.

For an optional manner, refer to the function of the identifier in S22 in the embodiment.

S142: Construct the candidate motion information list in the construction mode.

For an optional manner, refer to S22 in the embodiment.

For construction of the block-based candidate motion information list, refer to S11.1 and/or S11.2 in the embodiment.

For construction of the subblock-based candidate motion information list, refer to S12.1, S12.2, S12.3, and/or S12.4 in the embodiment.

S143: Determine optimal motion information from the constructed candidate motion information list based on the index. For an optional manner, refer to S13 in the embodiment.

S144: Predict the current block based on the optimal motion information. For an optional manner, refer to S14 in the embodiment.

FIG. 15 shows a decoding method. The method includes the following steps.

S151: Parse a bitstream to obtain a syntax element, where the syntax element includes at least an index of optimal candidate motion information of a current block.

For an optional manner, refer to S21 in the embodiment.

S152: Determine, based on the syntax element, to construct a first list or a second list for the current block, where the first list is a block-based candidate motion information list, and the second list is a subblock-based candidate motion information list.

For an optional manner, refer to S22 in the embodiment.

For construction of the block-based candidate motion information list, refer to S11.1 and/or S11.2 in the embodiment.

For construction of the subblock-based candidate motion information list, refer to S12.1, S12.2, S12.3, and/or S12.4 in the embodiment.

S153: Determine optimal motion information from the first list or the second list based on the index.

For an optional manner, refer to S23 in the embodiment.

S154: Predict the current block based on the optimal motion information.

For an optional manner, refer to S24 in the embodiment.

An example implementation solution has been fully described in the foregoing embodiment. Details are not described herein again.

For a clearer syntax table, refer to FIG. 16. FIG. 16 shows a merge data syntax table.

It can be learned that the syntax table or the bitstream includes merge_subblock_flag[x0][y0]. merge_subblock_flag[x0][y0] may correspond to indication information that may be used to indicate that the block-based candidate motion information list or the subblock-based candidate motion information list is used for the current block in the present disclosure.

Differences between Embodiment 2 and a current technology are as follows: A plurality of types of candidate motion information are inserted into different candidate motion information lists; the bitstream is parsed to obtain the index information of the optimal candidate motion information; and the current block is decoded based on corresponding motion information. According to Embodiment 2, the block-based candidate motion information list and the subblock-based candidate motion information list may be distinguished from each other. This effectively reduces transmission costs of the optimal candidate motion information.

Embodiment 3 (Encoder Side)

Brief descriptions: A list0 and a list1 are constructed in different motion information list construction modes for a current block (Block). The list0 is a candidate motion vector list used for the current block when the current block is predicted by using a block as a basic prediction unit. The list1 is a candidate motion vector list used for the current block when the current block is predicted by using a subblock as a basic prediction unit. The current block may be split into a plurality of subblocks, and each subblock may be in a square or rectangle shape. The subblock may have, for example but is not limited to, a size of 4×4, 8×8, or 4×8. The list0 and the list1 include candidate motion information. The candidate motion information includes a motion vector, a prediction direction, a reference index, and the like. Briefly, the list0 and the list1 are constructed in different motion information list construction modes applicable to features of the current block.

For example, the block-based list0 includes an HEVC mode, a non-adjacent mode, an ATMVP mode, or an STMVP mode; and the subblock-based list1 includes an AFFINE mode (including a motion model-based affine model merge mode or a control point-based complex merge mode) and a planar mode.

In an example implementation process, the list0 may include one or more of candidate motion vector derivation modes such as the HEVC mode, the non-adjacent mode, the ATMVP mode, and the STMVP mode. For example, in another embodiment, the list0 may alternatively include only the ATMVP mode. The list1 may include one or more of candidate motion vector derivation modes such as the AFFINE mode and the planar mode. In this application, a plurality of modes may be used for description.

S31: Construct a first candidate motion information list (List0) of a current coding block.

S31.1: implementation may be performed by using a method that is the same as or similar to the method in S11.1.

S31.2: implementation may be performed by using a method that is the same as or similar to the method in S11.2.

S31.3: implementation may be performed by using a method that is the same as or similar to the method in S12.3.

It should be noted that, in the present disclosure, a sequence of adding candidate motion information in S31.1 and S31.2 into the list is not limited for S31. The motion information in S31.1 may be added before the motion information in S31.2; or the motion information in S31.2 may be added before the motion information in S31.1; or the motion information in S31.1 and the motion information in S31.2 may be alternately added into the list.

S32: Construct a second candidate motion information list (List1) of the current coding block.

S32.1: implementation may be performed by using a method that is the same as or similar to the method in S12.1.

S32.2: implementation may be performed by using a method that is the same as or similar to the method in S12.2.

S32.3: implementation may be performed by using a method that is the same as or similar to the method in S12.4.

It should be noted that, in the present disclosure, a sequence of adding candidate motion information in S32.1, S32.2, and S32.3 into the list is not limited for S32. The candidate motion information may be added in a sequence; or different types of motion information may be alternately added into the list; or one or more of the candidate motion information in S32.1, S32.2, and S32.3 may be added into the list.

S33: Select optimal candidate motion information from the two lists, where implementation may be performed by using a method that is the same as or similar to the method in S13.

S34: Perform motion compensation on the current block based on the optimal candidate motion information obtained in S33, to obtain a sample predictor of the block. Implementation may be performed by using a method that is the same as or similar to the method in S14.

It should be understood that the list0 and the list1 may be interchanged.

Differences between Embodiment 3 and a current technology are as follows: Various candidate motion vectors are inserted into different candidate motion vector lists; a bitstream is parsed to obtain the index information of the optimal candidate motion information; and the current block is decoded based on corresponding motion information. According to Embodiment 3, a model-based subblock-based candidate motion information list and other candidate motion information may be distinguished from each other. This effectively reduces transmission costs of the optimal candidate motion information.

Embodiment 4 (Decoder Side)

Brief descriptions: Candidate motion information of a current block and candidate motion information of a current subblock may be respectively inserted (or constructed) into a list0 and a list1 in obtaining modes of the candidate motion information.

The block-based list0 includes an HEVC mode, a non-adjacent mode, an ATMVP mode, and an STMVP mode.

The subblock-based list1 includes an AFFINE mode (including a motion model-based affine model merge mode or a control point-based complex merge mode) and a planar mode.

In an example implementation process, the list0 may include one or more of candidate motion vector derivation modes such as the HEVC mode, the non-adjacent mode, the ATMVP mode, and the STMVP mode. For example, in another embodiment, the list0 may include only the ATMVP mode. The list1 may include one or more of candidate motion vector derivation modes such as the AFFINE mode and the planar mode. In this application, a plurality of modes may be used for description.

S41: Parse a bitstream to obtain index information of optimal candidate motion information.

In examples, the bitstream is parsed to obtain an index (for example, list-idx) of a candidate motion information list including the optimal candidate motion information and obtain an index value (for example, mv-index) of a location of the optimal candidate motion information in the list.

S42: Construct a candidate motion information list based on the index of the candidate motion information list.

If list-idx=0, implementation may be performed by using a method that is the same as or similar to the method in S31. For example, a block-based candidate motion information list is constructed in the mode in S31.1, S31.2, and/or S31.3. Correspondingly, for another example, a block-based candidate motion information list is constructed in the mode in S11.1, S11.2, and/or S12.3.

If list-idx=1, a model-based subblock-based candidate motion information list is constructed in the mode in S32.1, S32.2, and/or S32.3. Correspondingly, for another example, a subblock-based candidate motion information list is constructed in the mode in S12.1, S12.2, and/or S12.4.

S43: Determine the optimal candidate motion information based on the index information.

In examples, the optimal candidate motion information is determined from the list based on list-idx and mv-index.

S44: Perform motion compensation on the current block based on the optimal candidate motion information obtained in S43, to obtain a sample predictor of the block.

Differences between Embodiment 4 and a current technology are as follows: Different types of candidate motion information are inserted into different candidate motion information lists; the bitstream is parsed to obtain the index information of the optimal candidate motion information; and the current block is decoded based on corresponding motion information. According to Embodiment 4, the model-based subblock-based candidate motion information list and other candidate motion information may be distinguished from each other. This effectively reduces transmission costs of the optimal candidate motion information.

Embodiment 5 (Encoder Side)

Whether a current coding block satisfies a preset condition is determined. If the current coding block satisfies the preset condition, S51 and S52 are performed; or if the current coding block does not satisfy the preset condition, S51 is performed. Alternatively, if the current coding block satisfies the preset condition, S51 and S52 are performed; or if the current coding block does not satisfy the preset condition, S52 is performed.

The preset condition may be as follows:

(1) the width of the current coding block is greater than or equal to a threshold (for example, but not limited to 4, 8, 16, or 32), and/or the height of the current coding block is greater than or equal to a threshold (for example, but not limited to 4, 8, 16, or 32); or (2) a sample quantity (width×height) of the current coding block is greater than or equal to a threshold (for example, 256).

The preset condition may be agreed on by both the encoder side and a decoder side, or may be specified by using a higher-level syntax such as an SPS or a PPS.

S51: Construct a first candidate motion information list (List0) of the current coding block.

The first candidate motion information list is constructed by using the corresponding method, for example, the method in S11 in Embodiment 1 or S31 in Embodiment 3. Details are not described herein again.

S52: Construct a second candidate motion information list (List1) of the current coding block.

The second candidate motion information list is constructed by using the corresponding method, for example, the method in S12 in Embodiment 1 or S32 in Embodiment 3. Details are not described herein again.

S53: Select optimal candidate motion information.

If the current coding block satisfies the preset condition, the optimal candidate motion information is determined from the two candidate motion information lists according to a rate-distortion cost criterion, as motion information of the current coding block. Then, an index (for example, list-idx) of a candidate motion information list including the optimal candidate motion information and an index value (for example, mv-idx) of a location of the optimal candidate motion information in the list are transferred to the decoder side.

If the current coding block does not satisfy the preset condition, the optimal candidate motion information is determined from one candidate motion information list according to a rate-distortion cost criterion, as motion information of the current coding block. Then, an index value (for example, mv-idx) of a location of the optimal candidate motion information in the candidate motion information list is transferred to the decoder side.

S54: Perform motion compensation on the current block based on the optimal candidate motion information obtained in S53, to obtain a sample predictor of the block. Implementation may be performed by using a method that is the same as or similar to the method in S14 or S34.

Differences between Embodiment 5 and a current technology are as follows: Various candidate motion vectors are inserted into different candidate motion vector lists; a bitstream is parsed to obtain the index information of the optimal candidate motion information; and the current block is decoded based on corresponding motion information. In addition, different motion information lists are to be constructed based on the preset condition, and a used candidate list is conditionally parsed based on a feature of the current coding block, so that a quantity of bits required for indicating the candidate list can be reduced.

With reference to Embodiment 5, an encoding method procedure may be obtained as follows.

S161: If a size of a current block satisfies a preset sample quantity, construct a first list.

S162: Construct a second list, where the first list is a block-based candidate motion information list, the second list is a subblock-based candidate motion information list, and an inter prediction mode used for the current block is a merge mode.

S163: Determine optimal candidate motion information from the first list and the second list.

S164: Predict the current block based on the optimal motion information.

Optionally, before S161, the method may further include: determining whether the size of the current block satisfies the preset sample quantity.

Optionally, it is determined whether either the width or the height of the current coding block is greater than or equal to a threshold. For example, it is determined whether the width and/or the height are/is greater than or equal to 8.

If the size of the current block does not satisfy the preset sample quantity, the method further includes:

S165: Construct the first list, where the first list is the block-based candidate motion information list, and the inter prediction mode used for the current block is the merge mode.

S166: Determine the optimal candidate motion information from the first list.

S167: Predict the current block based on the optimal motion information.

It should be understood that S165 to S167 may constitute an implementable encoding method, independent of S161 to S164.

Embodiment 6 (Decoder Side)

S61: Parse a bitstream based on a preset condition, to obtain index information of optimal candidate motion information.

The preset condition may be as follows:

(1) the width of a current coding block is greater than or equal to a threshold (for example, but not limited to 4, 8, 16, or 32), and/or the height of the current coding block is greater than or equal to a threshold (for example, but not limited to 4, 8, 16, or 32); or (2) a sample quantity (width×height) of a current coding block is greater than or equal to a threshold (for example, 256).

The preset condition may be agreed on by both an encoder side and the decoder side, or may be specified by using a higher-level syntax such as an SPS or a PPS.

When the current coding block does not satisfy the preset condition (which may be understood as that none of the preset conditions is satisfied), the index information of the motion information is not parsed (only block-based motion information is used). In this case, a list0 (list-idx=0 in some implementations) is used by default, and an index value (mv-index) of a location in the list0 is parsed. In some examples, only the index value (mv-index) of the location in the list list0 may be parsed.

When the current coding block satisfies the condition (which may be understood as either of the preset conditions is satisfied), the bitstream is parsed to obtain an index (for example, list-idx, where a value of list-idx may be 0 or 1) of a candidate motion information list including the optimal candidate motion information and obtain an index value (for example, mv-index) of the location of the optimal candidate motion information in the candidate motion information list.

S62: Construct the candidate motion information list based on the index of the candidate motion information list.

In examples, the list may be constructed by using the corresponding method in Embodiment 2 or Embodiment 4. The list may be constructed by using a method that is the same as or similar to the method in S22 or S42. Details are not described herein again.

S63: Determine the optimal candidate motion information based on the index information.

In examples, the optimal candidate motion information is determined from the list based on list-idx and mv-index. The optimal candidate motion information may be determined by using a method that is the same as or similar to the method in S23 or S43. Details are not described herein again.

S64: Perform motion compensation on the current coding block based on the optimal candidate motion information obtained in S63, to obtain a sample predictor of the block. Implementation may be performed by using a method that is the same as or similar to the method in S24 or S44.

Differences between Embodiment 6 and a current technology are as follows: Various candidate motion vectors are inserted into different candidate motion vector lists; the bitstream is parsed to obtain the index information of the optimal candidate motion information; and the current coding block is decoded based on corresponding motion information. In addition, different motion information lists are to be constructed based on the preset condition, and a used candidate list is conditionally parsed based on a feature of the current coding block, so that a quantity of bits required for indicating the candidate list can be reduced.

Figure 17:
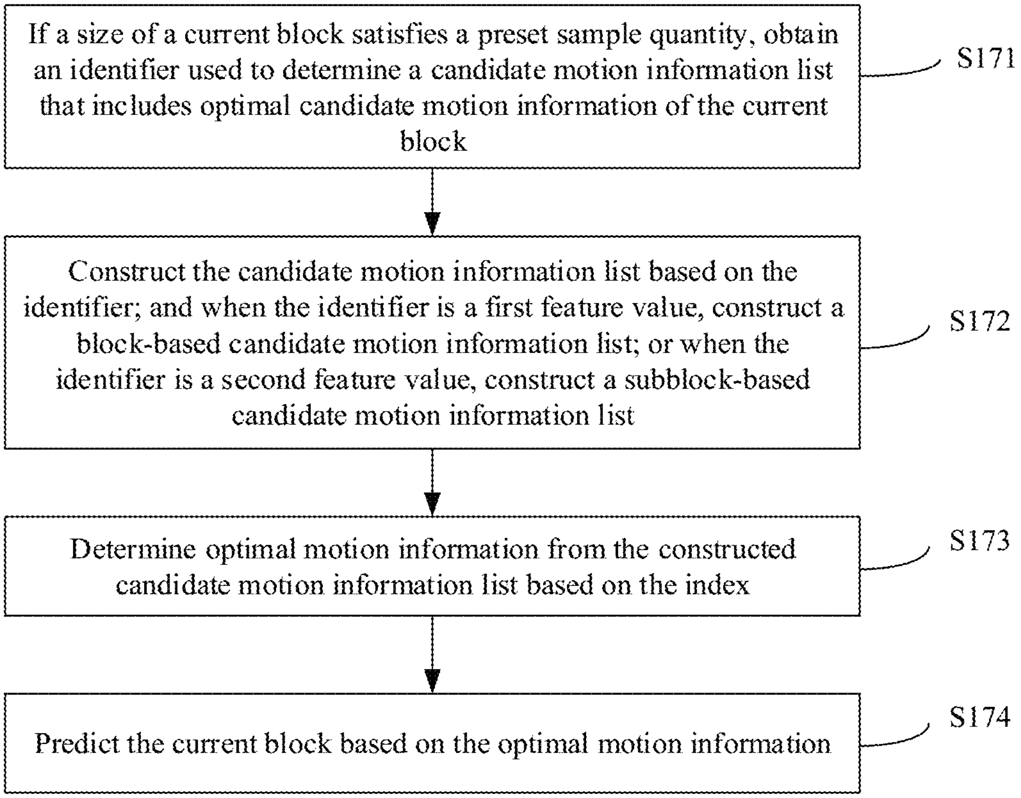
FIG. 17 shows another decoding method according to an embodiment of the present invention.

With reference Embodiment 6, a decoding method procedure may be obtained. Refer to FIG. 17. The method includes the following steps.

S171: If a size of a current block satisfies a preset sample quantity, obtain an identifier that is used to determine a candidate motion information list including optimal candidate motion information of the current block, and obtain an index of the optimal candidate motion information in the candidate motion information list, where an inter prediction mode used for the current block is a merge mode.

Optionally, for an example implementation, refer to S61.

S172: Construct the candidate motion information list based on the identifier; and when the identifier is a first feature value, construct a block-based candidate motion information list; or when the identifier is a second feature value, construct a subblock-based candidate motion information list.

Optionally, for an example implementation, refer to S62.

S173: Determine optimal motion information from the constructed candidate motion information list based on the index.

Optionally, for an example implementation, refer to S63.

S174: Predict the current block based on the optimal motion information.

Optionally, for an example implementation, refer to S64.

Before S171, the method further includes: determining whether the size of the current block satisfies a preset condition or the preset sample quantity.

Optionally, it is determined whether either the width or the height of the current coding block is greater than or equal to a threshold. For example, it is determined whether the width and/or the height are/is greater than or equal to 8.

If the size of the current block does not satisfy the preset sample quantity, the method further includes:

S175: Construct a first list, where the first list is the block-based candidate motion information list, and the inter prediction mode used for the current block is the merge mode.

S176: Determine the optimal candidate motion information from the first list.

S177: Predict the current block based on the optimal motion information.

It should be understood that S175 to S177 may constitute an implementable encoding method, independent of S171 to S174.

Embodiment 7 (Decoder Side)

S71: Parse a bitstream based on a preset condition, to obtain index information of optimal candidate motion information.

When a first preset condition is satisfied, an index of an optimal candidate motion information list is 0 (only block-based motion information is used). In other words, a list0 (which may be also indicated by list-idx=0) is used.

When a second preset condition is satisfied, an index of an optimal candidate motion information list is 1 (only sub-block-based motion information is used). In other words, a list1 (which may be also indicated by list-idx=1) is used.

When neither the first preset condition nor the second preset condition is satisfied, the bitstream is parsed to obtain an index (for example, list-idx) of a candidate motion information list including the optimal candidate motion information, and it is determined, based on list-idx, whether the list0 or the list1 is to be used. Finally, an index value (for example, mv-index) of a location of the optimal candidate motion information in the corresponding list is parsed. The first preset condition may be as follows:

(1) the width of a current coding block is less than a first threshold (for example, 16), and/or the height of the current coding block is less than a first threshold (for example, 16); or (2) a sample quantity (width×height) of a current coding block is less than a first threshold (for example, 256).

The first preset condition may be agreed on by both an encoder side and the decoder side, or may be specified by using higher-level syntax such as SPS or PPS.

The second preset condition may be as follows:

(1) the width of a current coding block is greater than or equal to a second threshold (for example, 64), and/or the height of the current coding block is greater than or equal to a second threshold (for example, 64); or (2) a sample quantity (width×height) of a current coding block is greater than or equal to a second threshold (for example, 1024).

The second preset condition may be agreed on by both an encoder side and the decoder side, or may be specified by using a higher-level syntax such as an SPS or a PPS.

The second threshold is greater than the first threshold.

S72: Construct the candidate motion information list based on the index of the candidate motion information list.

In examples, the list may be constructed by using the corresponding method in Embodiment 2, Embodiment 4, or Embodiment 6. The list may be constructed by using a method that is the same as or similar to the method in S22, S42, or S62. Details are not described herein again.

S73: Determine the optimal candidate motion information based on the index information.

In examples, the optimal candidate motion information is determined from the list based on list-idx and mv-index. The optimal candidate motion information may be determined by using a method that is the same as or similar to the method in S23, S43, or S63. Details are not described herein again.

S74: Perform motion compensation on the current coding block based on the optimal candidate motion information obtained in S73, to obtain a sample predictor of the block. Implementation may be performed by using a method that is the same as or similar to the method in S24, S44, or S64.

Differences between Embodiment 7 and a current technology are as follows: Various candidate motion vectors are inserted into different candidate motion vector lists; the bitstream is parsed to obtain the index information of the optimal candidate motion information; and the current coding block is decoded based on corresponding motion information. In addition, different motion information lists are constructed based on the preset conditions, and a used candidate list is conditionally parsed based on a feature of the current coding block, so that a quantity of bits required for indicating the candidate list can be reduced.

Figure 18:
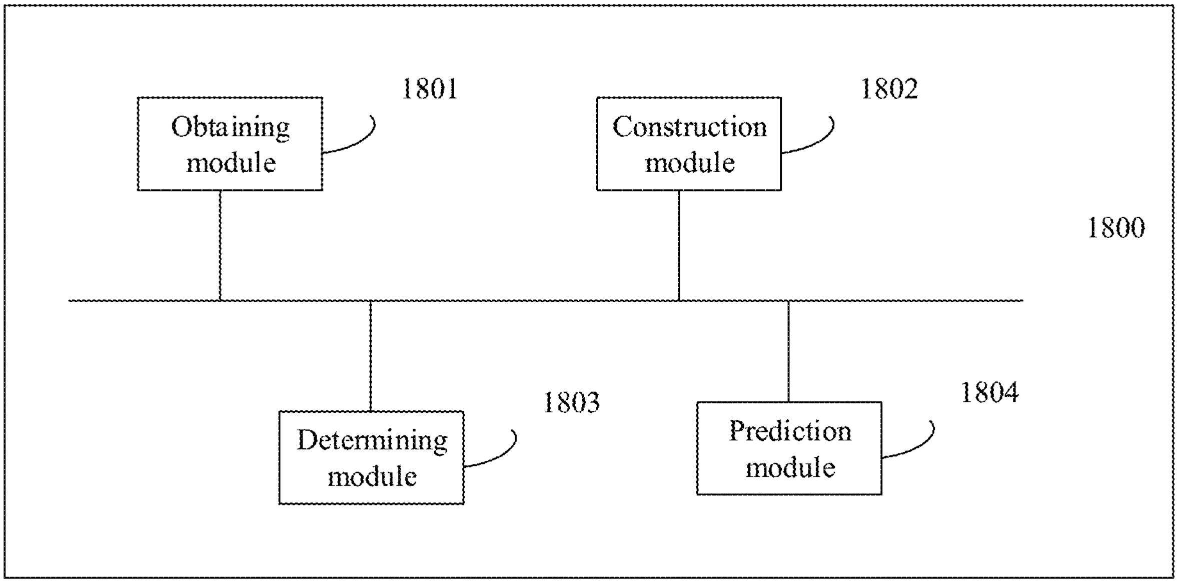
FIG. 18 shows a decoding apparatus according to an embodiment of the present invention.

An embodiment of this application provides an apparatus 1800. Refer to FIG. 18. The apparatus 1800 includes:

an obtaining module 1801, configured to obtain index information of optimal candidate motion information of a current block;

a construction module 1802, configured to construct a candidate motion information list based on the index information, where a mode of obtaining a motion vector included in the candidate motion information list varies with a field of the index information;

a determining module 1803, configured to determine an optimal motion vector from the candidate motion information list based on the index information; and a prediction module 1804, configured to predict the current block based on the optimal motion vector.

In some examples, the obtaining module 1801 is configured to perform the corresponding method in S21 and an equivalent method that may be used for partial replacement. The construction module 1802 is configured to perform the corresponding method in S22 and an equivalent method that may be used for partial replacement. The determining module 1803 is configured to perform the corresponding method in S23 and an equivalent method that may be used for partial replacement. The prediction module 1804 is configured to perform the corresponding method in S24 and an equivalent method that may be used for partial replacement.

In some examples, the obtaining module 1801 is configured to perform the corresponding method in S41 and an equivalent method that may be used for partial replacement. The construction module 1802 is configured to perform the corresponding method in S42 and an equivalent method that may be used for partial replacement. The determining module 1803 is configured to perform the corresponding method in S43 and an equivalent method that may be used for partial replacement. The prediction module 1804 is configured to perform the corresponding method in S44 and an equivalent method that may be used for partial replacement.

In some examples, the obtaining module 1801 is configured to perform the corresponding method in S51 and an equivalent method that may be used for partial replacement. The construction module 1802 is configured to perform the corresponding method in S52 and an equivalent method that may be used for partial replacement. The determining module 1803 is configured to perform the corresponding method in S53 and an equivalent method that may be used for partial replacement. The prediction module 1804 is configured to perform the corresponding method in S54 and an equivalent method that may be used for partial replacement.

In some examples, the obtaining module 1801 is configured to perform the corresponding method in S61 and an equivalent method that may be used for partial replacement. The construction module 1802 is configured to perform the corresponding method in S62 and an equivalent method that may be used for partial replacement. The determining module 1803 is configured to perform the corresponding method in S63 and an equivalent method that may be used for partial replacement. The prediction module 1804 is configured to perform the corresponding method in S64 and an equivalent method that may be used for partial replacement.

In some examples, the obtaining module 1801 is configured to perform the corresponding method in S71 and an equivalent method that may be used for partial replacement. The construction module 1802 is configured to perform the corresponding method in S72 and an equivalent method that may be used for partial replacement. The determining module 1803 is configured to perform the corresponding method in S73 and an equivalent method that may be used for partial replacement. The prediction module 1804 is configured to perform the corresponding method in S74 and an equivalent method that may be used for partial replacement.

In addition, the obtaining module 1801 is configured to perform the method corresponding to S141, S151, or S171 and an equivalent method that may be used for partial replacement of S141, S151, or S171. The construction module 1802 is configured to perform the method corresponding to S142, S152, or S172 and an equivalent method that may be used for partial replacement of S142, S152, or S172. The determining module 1803 is configured to perform the method corresponding to S143, S153, or S173 and an equivalent method that may be used for partial replacement of S143, S153, or S173. The prediction module 1804 is configured to perform the method corresponding to S144, S154, or S174 and an equivalent method that may be used for partial replacement of S144, S154, or S174.

Figure 19:
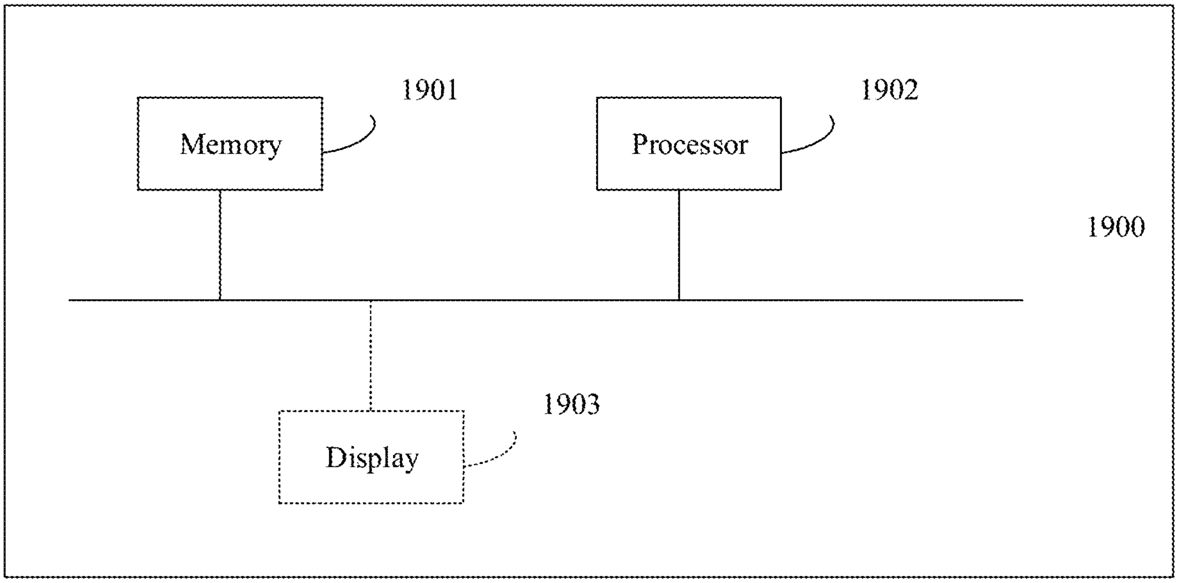
FIG. 19 shows a coding device according to an embodiment of the present invention.

An embodiment of this application provides an encoding device 19. Refer to FIG. 19. The device may be a versatile coding device, and includes a nonvolatile memory and a processor coupled to each other. The processor invokes program code stored in the memory to perform methods such as S11, S12, S13, and S14 and equivalent methods.

An embodiment of this application provides an encoding device 19, including a nonvolatile memory and a processor coupled to each other. The processor invokes program code stored in the memory to perform methods such as S31, S32, S33, and S34 and equivalent methods.

An embodiment of this application provides an encoding device 19, including a nonvolatile memory and a processor coupled to each other. The processor invokes program code stored in the memory to perform methods such as S51, S52, S53, and S54 and equivalent methods.

An embodiment of this application provides a decoding device 19 (where the device may be a coding device), including a nonvolatile memory 1901 and a processor 1902 coupled to each other. The processor invokes program code stored in the memory to perform methods such as S21, S22, S23, and S24 and equivalent methods.

An embodiment of this application provides a decoding device 19, including a nonvolatile memory 1901 and a processor 1902 coupled to each other. The processor invokes program code stored in the memory to perform methods such as S41, S42, S43, and S44 and equivalent methods.

An embodiment of this application provides a decoding device 19, including a nonvolatile memory 1901 and a processor 1902 coupled to each other. The processor invokes program code stored in the memory to perform methods such as S61, S62, S63, and S64 and equivalent methods.

An embodiment of this application provides a decoding device 19, including a nonvolatile memory 1901 and a processor 1902 coupled to each other. The processor invokes program code stored in the memory to perform methods such as S71, S72, S73, and S74 and equivalent methods.

The coding device 19 may further include a display 1903, configured to display a video picture.

An embodiment of this application provides a computer-readable storage medium. The computer-readable storage medium stores program code. The program code includes an instruction used to perform some or all steps of S11 to S14, S21 to S24, S31 to S34, S41 to S44, S51 to S54, S61 to S64, and/or S71 to S74.

An embodiment of this application provides a computer program product. When the computer program product runs on a computer, the computer performs some or all steps of S11 to S14, S21 to S24, S31 to S34, S41 to S44, S51 to S54, S61 to S64, and/or S71 to S74.

It should be understood that explanations and descriptions of some technical features in the method embodiments are also applicable to apparatus embodiments, encoding devices, decoding devices, computer programs, storage media, and the like.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may be generally corresponding to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, a server, or another remote source through a coaxial cable, an optical fiber, a twisted pair, a digital subscriber line (DSL), or wireless technologies such as infrared, radio, and microwave, the coaxial cable, the fiber optic cable, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

An instruction may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A decoding method, comprising:

when a size of a current block satisfies a preset sample quantity, parsing a bitstream of a video to obtain a syntax element, wherein the syntax element comprises at least an index of candidate motion information for a current block of the video and an identifier indicating to construct a list of motion information of the current block based on candidate motion information obtained through block-based prediction or candidate motion information obtained through subblock-based prediction;

constructing, based on the identifier, the list of motion information for the current block, wherein the list of motion information is a first list of motion information which is a block-based candidate motion information list of the current block, or a second list of motion information which is a subblock-based candidate motion information list of one or more subblocks of the current block, wherein the block-based candidate motion information list includes at least one of motion information of a spatially neighboring coded block of the current block or motion information of a temporally neighboring coded block of the current block, and the subblock-based candidate motion information list includes a candidate motion information that is constructed in a motion model based affine model merge mode (AMM), in a complex merge mode, in an advanced temporal motion vector prediction (ATMVP), or in a combination of one or more of the AMM, the complex merge mode or the ATMVP, wherein a first feature value of the identifier indicates to construct the first list for the current block, and a second feature value of the identifier indicates to construct the second list for the current block;

determining motion information from the constructed list of motion information for the current block based on the index of the candidate motion information; and generating predicted samples for the current block based on the motion information, wherein the list of motion information is the second list of motion information and constructing the second list of motion information comprises:

determining a collocated reference picture of the current block;

splitting the current block into M*N subblocks, M being different from N;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

2. The decoding method according to claim 1, wherein the subblock-based candidate motion information list is constructed only based on a subblock-based merge mode of advanced temporal motion vector prediction (ATMVP).

3. The decoding method according to claim 1, wherein the syntax element further comprises indication information indicating that the block-based candidate motion information list is for the current block or indication information indicating that the subblock-based candidate motion information list is for the current block.

4. The decoding method according to claim 1, wherein a width of the current block is greater than or equal to a threshold, or a height of the current block is greater than or equal to a threshold.

5. A decoding apparatus, comprising:

one or more processors; and a non-transitory computer-readable medium storing program code that, when executed by the one or more processors, causes the one or more processors to perform operations comprising:

when a size of a current block satisfies a preset sample quantity, parsing a bitstream of a video to obtain a syntax element, wherein the syntax element comprises at least an index of candidate motion information for a current block of the video and an identifier indicating to construct a list of motion information of the current block based on candidate motion information obtained through block-based prediction or candidate motion information obtained through subblock-based prediction;

constructing, based on the identifier, the list of motion information for the current block, wherein the list of motion information is a first list of motion information which is a block-based candidate motion information list of the current block, or a second list of motion information which is a subblock-based candidate motion information list of one or more subblocks of the current block, wherein the block-based candidate motion information list includes at least one of motion information of a spatially neighboring coded block of the current block or motion information of a temporally neighboring coded block of the current block, and the subblock-based candidate motion information list includes a candidate motion information that is constructed in a motion model based affine model merge mode (AMM), in a complex merge mode, in an advanced temporal motion vector prediction (ATMVP), or in a combination of one or more of the AMM, the complex merge mode or the ATMVP, wherein a first feature value of the identifier indicates to construct the first list for the current block, and a second feature value of the identifier indicates to construct the second list for the current block;

determining motion information from the constructed list of motion information for the current block based on the index of the candidate motion information; and generating predicted samples for the current block based on the motion information, wherein the list of motion information is the second list of motion information and constructing the second list of motion information comprises:

determining a collocated reference picture of the current block;

splitting the current block into M*N subblocks, M being different from N;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

6. The decoding apparatus according to claim 5, wherein the subblock-based candidate motion information list comprises a candidate motion information list that is constructed only in a subblock-based merge mode of advanced temporal motion vector prediction (ATMVP).

7. The decoding apparatus according to claim 5, wherein the list of motion information is the second list of motion information and constructing the second list of motion information comprises:

determining a collocated reference picture of the current block;

splitting the current block into M*N subblocks;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

8. The decoding apparatus according to claim 5, wherein the syntax element further comprises indication information indicating that the block-based candidate motion information list is for the current block or indication information indicating that the subblock-based candidate motion information list is for the current block.

9. The decoding apparatus according to claim 5, wherein a width of the current block is greater than or equal to a threshold, or a height of the current block is greater than or equal to a threshold.

10. An encoding method, comprising:

constructing a first list of motion information for a current block in a video, wherein the first list of motion information is a block-based candidate motion information list of the current block, wherein the block-based candidate motion information list includes at least one of motion information of a spatially neighboring coded block of the current block or motion information of a temporally neighboring coded block of the current block; or constructing a second list of motion information for the current block, wherein the second list of motion information is a subblock-based candidate motion information list of one or more subblocks of the current block, wherein the subblock-based candidate motion information list includes a candidate motion information that is constructed in a motion model based affine model merge mode (AMM), in a complex merge mode, in an advanced temporal motion vector prediction (ATMVP), or in a combination of one or more of the AMM, the complex merge mode or the ATMVP;

when a size of a current block satisfies a preset sample quantity, determining candidate motion information for the current block from the first list of motion information or from the second list of motion information; and obtaining an identifier that is used to determine a candidate motion information list for the current block, the candidate motion information list comprising the candidate motion information for the current block, wherein the identifier indicates to construct the candidate motion information list for the current block based on candidate motion information obtained through block-based prediction or candidate motion information obtained through subblock-based prediction; and obtaining an index of the candidate motion information in the candidate motion information list, wherein an inter prediction mode used for the current block is a merge mode, and when the identifier is a first feature value, the candidate motion information list is the first list, or when the identifier is a second feature value, the candidate motion information list is the second list; and generating predicted samples for the current block based on the candidate motion information; and encoding the identifier and the index into a bitstream of the video;

wherein the list of motion information is the second list of motion information and constructing the second list of motion information comprises:

determining a collocated reference picture of the current block;

splitting the current block into M*N subblocks, M being different from N;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

11. The encoding method according to claim 10, wherein constructing the second list of motion information comprises:

determining a collocated reference picture of the current block;

splitting the current block into M*N subblocks;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

12. An encoding apparatus, comprising:

one or more processors; and a non-transitory computer-readable medium storing program code that, when executed by the one or more processors, causes the one or more processors to perform operations comprising:

constructing a first list of motion information for a current block in a video, wherein the first list of motion information is a block-based candidate motion information list of the current block, wherein the block-based candidate motion information list includes at least one of motion information of a spatially neighboring coded block of the current block or motion information of a temporally neighboring coded block of the current block; or constructing a second list of motion information for the current block, wherein the second list of motion information is a subblock-based candidate motion information list of one or more subblocks of the current block, wherein the subblock-based candidate motion information list includes a candidate motion information that is constructed in a motion model based affine model merge mode (AMM), in a complex merge mode, in an advanced temporal motion vector prediction (ATMVP), or in a combination of one or more of the AMM, the complex merge mode or the ATMVP;

when a size of a current block satisfies a preset sample quantity, determining candidate motion information for the current block from the first list of motion information or from the second list of motion information; and obtaining an identifier that is used to determine a candidate motion information list for the current block, the candidate motion information list comprising candidate motion information of the current block, wherein the identifier indicates to construct the candidate motion information list for the current block based on candidate motion information obtained through block-based prediction or candidate motion information obtained through subblock-based prediction; and obtaining an index of the candidate motion information in the candidate motion information list, wherein an inter prediction mode used for the current block is a merge mode, and when the identifier is a first feature value, the candidate motion information list is the first list, or when the identifier is a second feature value, the candidate motion information list is the second list; and generating predicted samples for the current block based on the candidate motion information; and encoding the identifier and the index into a bitstream of the video, wherein the list of motion information is the second list of motion information and constructing the second list of motion information comprises:

determining a collocated reference picture of the current block;

splitting the current block into M*N subblocks, M being different from N;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

13. The encoding apparatus according to claim 12, wherein constructing the second list of motion information comprises:

determining a collocated reference picture of the current block;

splitting the current block into M*N subblocks;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

14. A non-transitory computer-readable storage medium, comprising the bitstream of the video processed through decoding by using the decoding method according to claim 1.

15. A non-transitory computer-readable storage medium, comprising the bitstream of the video generated by using the encoding method according to claim 10.

16. A non-transitory storage medium storing instructions that, when executed by one or more processors, cause the one or more processors to generate an encoded bitstream for video signals, the encoded bitstream comprises a syntax element and an identifier when a size of a current block satisfies a preset sample quantity, wherein the syntax element comprises at least an index of candidate motion information for a current block of the video and the identifier indicating to construct a list of motion information of the current block based on candidate motion information obtained through block-based prediction or candidate motion information obtained through subblock-based prediction, wherein the identifier is used to construct the list of motion information for the current block, wherein the list of motion information is a first list of motion information which is a block-based candidate motion information list of the current block, or a second list of motion information which is a subblock-based candidate motion information list of one or more subblocks of the current block, wherein the block-based candidate motion information list includes at least one of motion information of a spatially neighboring coded block of the current block or motion information of a temporally neighboring coded block of the current block, and the subblock-based candidate motion information list includes a candidate motion information that is constructed in a motion model based affine model merge mode (AMM), in a complex merge mode, in an advanced temporal motion vector prediction (ATMVP), or in a combination of one or more of the AMM, the complex merge mode or the ATMVP, wherein a first feature value of the identifier indicates to construct the first list for the current block, and a second feature value of the identifier indicates to construct the second list for the current block;

wherein the index of the candidate motion information is used to determine motion information from the constructed list of motion information for the current block;

wherein motion information is used to generate predicted samples for the current block;

wherein the list of motion information is the second list of motion information and constructing the second list of motion information comprises:

determining a collocated reference picture of the current block;

splitting the current block into M*N subblocks, M being different from N;

for each subblock of the M*N subblocks, obtaining motion information of a center point location sample of a subblock unit that corresponds to the subblock and that is in the collocated reference picture, and converting the motion information of the center point location sample into motion information of the subblock through scaling; and obtaining the second list of motion information based on the motion information of the M*N subblocks.

17. The decoding method according to claim 1, wherein the size of the current block satisfies the preset sample quantity when a width of the current block is greater than or equal to a threshold, and/or a height of the current block is greater than or equal to a threshold.

* * * * *